US009454898B2

(12) United States Patent
Kim et al.

(10) Patent No.: US 9,454,898 B2
(45) Date of Patent: Sep. 27, 2016

(54) PORTABLE DEVICE, SMART WATCH, AND METHOD OF CONTROLLING THEREFOR

(71) Applicant: LG ELECTRONICS INC., Seoul (KR)

(72) Inventors: Jihwan Kim, Seoul (KR); Jongho Kim, Seoul (KR); Doyoung Lee, Seoul (KR); Eunhyung Cho, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 14/193,821

(22) Filed: Feb. 28, 2014

(65) Prior Publication Data

US 2015/0208141 A1 Jul. 23, 2015

(30) Foreign Application Priority Data

Jan. 21, 2014 (KR) ........................ 10-2014-0007192

(51) Int. Cl.
*H04Q 9/00* (2006.01)
*G08C 17/02* (2006.01)

(52) U.S. Cl.
CPC ........... *G08C 17/02* (2013.01); *G08C 2201/20* (2013.01); *G08C 2201/93* (2013.01)

(58) Field of Classification Search
CPC .............. G08C 17/02; G08C 2201/20; G08C 2201/93; H04Q 9/00
See application file for complete search history.

(56) References Cited

U.S. PATENT DOCUMENTS

| | | | |
|---|---|---|---|
| 6,477,117 B1 | 11/2002 | Narayanaswami et al. | |
| 7,081,905 B1 * | 7/2006 | Raghunath | G04G 5/00 345/684 |
| 2002/0081976 A1 * | 6/2002 | Fujisawa | G04B 47/00 455/88 |
| 2008/0070612 A1 | 3/2008 | Weinans | |
| 2009/0069045 A1 | 3/2009 | Cheng | |
| 2009/0231960 A1 | 9/2009 | Hutcheson | |
| 2011/0003665 A1 | 1/2011 | Burton et al. | |
| 2013/0053011 A1 | 2/2013 | Lee et al. | |
| 2013/0342457 A1 | 12/2013 | Cox et al. | |

* cited by examiner

*Primary Examiner* — Sisay Yacob
(74) *Attorney, Agent, or Firm* — Birch, Stewart, Kolasch & Birch, LLP

(57) ABSTRACT

The present specification relates to a portable device, a smart watch, which is used in a manner of being synchronized with the portable device, and a method of controlling therefor. According to one embodiment, the processor configured to detect a first external device including a second ID, if the second ID of the first external device is identical to the first ID of the portable device, the processor configured to include the first ID of the portable device in ID information, if the second ID of the first external device is different from the first ID of the portable device, the processor configured to include the second ID of the first external device in the ID information, the processor configured to transmit the data including the ID information to a second external device.

20 Claims, 17 Drawing Sheets

PORTABLE DEVICE, SMART WATCH, AND METHOD OF CONTROLLING THEREFOR

This application claims the benefit of the Korean Patent Application No. 10-2014-0007192, filed on Jan. 21, 2014, which is hereby incorporated by reference as if fully set forth herein.

BACKGROUND OF THE INVENTION

1. Field of the Invention

The present specification relates to a portable device, a smart watch, which is used in a manner of being synchronized with the portable device, and a method of controlling therefor, and more particularly, if the portable device transmits data to a different device, to a method for the portable device to detect the smart watch and transmit data including an ID of the smart watch to the different device.

2. Discussion of the Related Art

As technologies are developing, development for a wearable computer is accelerated. In this case, the wearable computer indicates a computer capable of being worn on a body like clothes, a watch, glasses, or accessories. Both a smartphone and a tablet PC can be conveniently used by a finger or a touch pen. Yet, there may exist inconvenience of carrying the smartphone or the tablet PC in a pocket, a bag, or by hand. On the contrary, since the wearable computer can be worn on the wrist or can be worn like glasses, the wearable computer is superior to the smartphone or the tablet PC in terms of mobility. In particular, as a sort of the wearable computer, a wrist watch capable of searching for such various services as a diary, a message, a notification, stock quotes, and the like, i.e., various products for a smart watch are emerging.

Yet, since a smart watch is a miniaturized device, there may exist a limit for providing various functions that a user wants. Hence, the smart watch can be used in a manner of being synchronized with such an external portable device as a smartphone. More specifically, the smart watch is synchronized with a portable device and then function of the smart watch can be expanded by the portable device. More specifically, the smart watch is synchronized with the portable device and can make a call or transceive data with an external device using the portable device. In this case, a user of the portable device may be different from a user of the smart watch. In particular, the user of the smart watch can make a call or transceive data with an external device using the portable device of a different user. Hence, in case that the user of the smart watch uses the portable device of a different user, it is necessary for the portable device to determine which information is transmitted to the external device among information on the user of the portable device and information on the user of the smart watch.

In particular, if the portable device and the smart watch synchronized with the portable device operate at the same time, it is necessary for the portable device to determine whether data transmitted to an external device corresponds to data of the portable device or data of the smart watch.

SUMMARY OF THE INVENTION

Accordingly, the present specification is directed to an apparatus and method thereof that substantially obviate one or more problems due to limitations and disadvantages of the related art.

One object of the present specification is to provide a portable device, a smart watch used in a manner of being synchronized with the portable device, and a method of controlling therefor.

In particular, if a portable device transmits data to an external device, another object of the present specification is to provide a method for the portable device to distinguish data including information on the portable device from data including information on a smart watch.

And, if a portable device detects a smart watch synchronized with the portable device, another object of the present specification is to provide a method for the portable device to detect the smart watch.

And, if a portable device transmits data to an external device and receives reply data from the external device, the other object of the present specification is to provide a method of determining a device for receiving the reply data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a portable device including a first ID includes a display unit configured to display visual information, a sensor unit configured to sense a control input and deliver the sensed control input to a processor, a communication unit configured to transceive data with an external device, and the processor configured to control the display unit, the sensor unit, and the communication unit, if data is transmitted by the control input, the processor configured to detect a first external device including a second ID, if the second ID of the first external device is identical to the first ID of the portable device, the processor configured to include the first ID of the portable device in ID information, if the second ID of the first external device is different from the first ID of the portable device, the processor configured to include the second ID of the first external device in the ID information, the processor configured to transmit the data including the ID information to a second external device.

And, according to one embodiment, a smart watch including a first ID includes a communication unit configured to transceive data with an external device and a processor configured to control the communication unit, the processor configured to receive an ID request signal transmitted from a first external device including a second ID using the communication unit and transmit a response signal to the first external device based on the ID request signal, wherein the response signal includes an ID of the first external device, wherein if the first ID of the smart watch is identical to the second ID of the first external device, the first external device transmits the second ID of the first external device to a second external device, wherein if the first ID of the smart watch is different from the second ID of the first external device, the first external device transmits the first ID of the smart watch to the second external device.

Accordingly, the present specification provides the following effects or advantages.

According to the present specification, if a portable device transmits data to an external device, the portable device can transmit an ID of the portable device and an ID of a smart watch synchronized with the portable device to the external device.

And, according to the present specification, if the portable device transmits data to the external device, the portable device can transmit the ID of the smart watch synchronized with the portable device only to the external device.

And, according to the present specification, if the portable device transmits data to the external device, the portable device can detect the external device.

And, according to the present specification, the portable device can detect a smart watch and receive an ID of the smart watch.

And, according to the present specification, the portable device can be paired with the smart watch within a prescribed distance.

And, according to the present specification, the portable device searches for neighboring devices situating within a prescribed distance and can detect a smart watch by a user input.

And, according to the present specification, if the portable device transmits an ID of the smart watch to the external device, the portable device can deliver a feedback to the smart watch.

And, according to the present specification, if the portable device transmits data to the external device and the external device transmits a reply data to the portable device, it may determine a device for receiving the reply data among the portable device and the smart watch.

And, according to the present specification, the portable device can transmit a memo written by a user to the smart watch.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

While embodiments have been described in detail with reference to the attached drawings and the contents written on the diagrams, the scope of claims may be non-restricted or non-limited by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a portable device 100 may correspond to a smartphone, a smart pad, a tablet computer, a notebook, or a PDA. Moreover, the portable device 100 may include a head mounted display. In cased of the head mounted display, a user can control an object displayed by an augmented reality instead of controlling a display unit 110.

In the present specification, a smart watch 200 means a wearable device capable of being carried by a user in a manner of being worn on a body of the user. As one embodiment, the smart watch 200 can be worn on the wrist of the user like a wrist watch. And, the smart watch 200 can be worn on a different part of the body if necessary. Moreover, the smart watch 200 can be replaced with a smartphone, a smart pad, a tablet computer, a notebook, a PDA, or a head mounted display in the present specification. In particular, for clarity, the present specification is explained by commonly calling them as the smart watch 200. Yet, although the present specification is explained with an example of the smart watch 200, the smart watch can be applied to data transmission and reception between two devices among the aforementioned devices.

In the present specification, an external device may correspond to a smartphone, a smart pad, a tablet computer, a notebook, or a PDA. In this case, the external device can receive data from a portable device 100. The external device can initiate a call with the portable device 100. The external device may correspond to a device receiving data of the smart watch 200 from the portable device 100. The external device can initiate a call with the smart watch 200 using the portable device. In particular, the external device may correspond to the external devices transceiving data or initiating a call with the portable device 100 or the smart watch 200.

Figure 1:
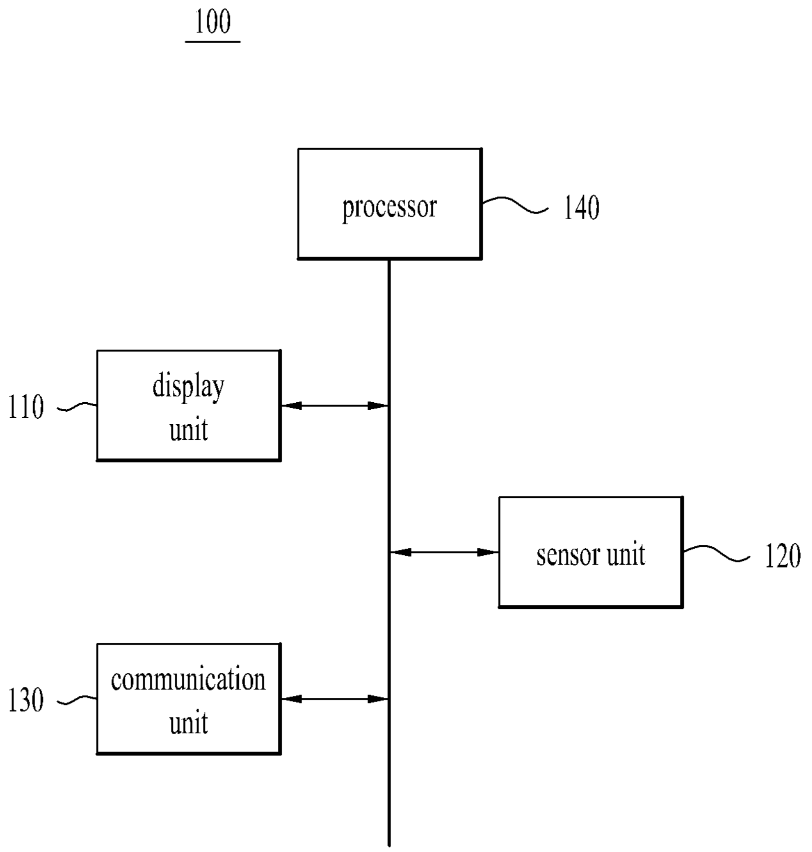
FIG. 1 is a block diagram for a portable device according to one embodiment of the present specification.

FIG. 1 is a block diagram for a portable device 100 according to one embodiment of the present specification. The portable device 100 can include a display unit 110, a sensor unit 120, a communication unit 130, and a processor 140.

The display unit 110 can output visual information in a display screen. The display unit 110 can output the visual information based on content executed by the processor 140 or a control command of the processor 140. More specifically, the portable device 100 can detect an input for transmitting data based on the control command of the processor 140. In this case, the portable device 100 can detect a smart watch 200. If the portable device 100 detects the smart watch 200, the display unit 110 can display information on the smart watch 200. More specifically, the display unit 110 can display an ID of the smart watch 200, user information, and information related to the smart watch 200. And, as an example, if the portable device 100 detects the smart watch 200, the display unit 110 can display a list of external devices for which the portable device has searched. In this case, the portable device 100 obtains a control input of a user who is selecting the smart watch 200 among the external devices and can detect the smart watch 200. And, the display unit 110 can display a connection state between the portable device 100 and the smart watch 200. As an example, the display unit 110 can display visual information for confirming that the portable device 100 and the smart watch 200 are in a state of being paired with each other.

The display unit 110 can include at least one of an organic light-emitting diode (OLED), a liquid crystal display (LCD), an E-ink, a head mounted display (HMD), and a flexible display depending on an embodiment.

The sensor unit 120 senses a control input and can deliver the sensed control input to the processor 140. In this case, the control input may correspond to a control input for executing various functions of a user. As an example, the control input may correspond to a control input for transmitting data to an external device by the portable device 100. And, the control input may correspond to a control input of a user for enabling the portable device 100 to generate a memo. Besides, the control input may correspond to a control input of the user for executing a function. And, the sensor unit 120 can deliver a sensed control input to the processor 140.

The sensor unit 120 can sense a touch input as a control input using a touch sensor. Or, the sensor unit 120 can sense a tilt of the portable device 100 as a control input using a gyro sensor or an acceleration sensor. Or, the sensor unit 120 can sense a gesture input as a control input using a proximity sensor. Or, the sensor unit 120 can sense an audio input as a control input using an audio recognition sensor. Besides, the sensor unit 120 can sense a control input via an input device. In this case, the input device may include a mouse, a keyboard, or a remote controller. In particular, the sensor unit 120 of the present specification senses a control input for executing functions using the aforementioned sensor units and can deliver the sensed control input to the processor 140. At least one of the aforementioned sensing units is called the sensor unit 130 in the present specification.

In this case, the aforementioned sensors are included in the portable device 100 as a separate element or may be included in the portable device in a manner of being integrated to at least one element. The sensor unit 130 may be non-limited to the aforementioned embodiment of the sensor and may use a sensor corresponding to the embodiment.

The aforementioned display unit 110 and the sensor unit 120 can be implemented by a single touch sensitive display unit according to embodiment. In this case, the touch sensitive display unit may include a capacitive touch panel or a resistive touch panel.

The communication unit 130 performs a communication with the smart watch 200 or an external device using various protocols and can transceive data using the same. The communication unit 130 can transmit and receive such a digital data as content and the like by accessing a network in wireless or wired. The portable device 100 can initiate a call with an external device using the communication unit 130. The portable device 100 can perform a pairing with the smart watch 200 using the communication unit 130. In this case, the portable device 100 performs a pairing with the smart watch 200 and can transmit an ID of the smart watch 200 to the external device. And, the portable device 100 can transmit data of the smart watch 200 to the external device. As a different example, a user of the smart watch 200 can use a function of the smart watch 200 in a manner of expanding its function using the portable device 100 in which the pairing is performed. Regarding this, it shall be described later with reference to FIG. 5*c*.

The communication unit 130 transmits an ID request signal to the smart watch 200 or a neighboring external device and can receive a response signal. And, the communication unit 130 transmits a device search signal to the smart watch 200 or a neighboring device and can perform a device search. In particular, the communication unit 130 performs a communication with the external device situating in the vicinity of the portable device 100 using various protocols and can transmit and receive data with the external device.

The processor 140 can execute a function according to the control input delivered from the sensor unit 120. As an example, the processor 140 receives a control input for transmitting data to an external device and can transmit the data to the external device. And, the processor 140 receives a control input for initiating a call with an external device and can initiate the call with the external device.

More specifically, according to the present specification, if the processor 140 receives a control input for transmitting data, the processor 140 detects a smart watch 200 and can transmit an ID of the smart watch 200 and the data to an external device. By doing so, a user of the smart watch 200 can transceive the data with a different external device using the portable device 100. Regarding this, it shall be described later.

Figure 2:
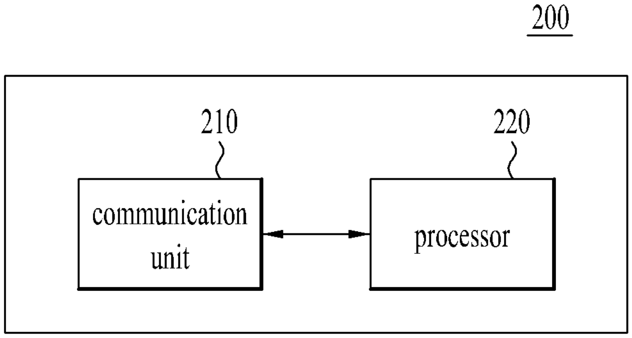
FIG. 2 is a block diagram for a smart watch according to one embodiment of the present specification.

FIG. 2 is a block diagram for a smart watch according to one embodiment of the present specification. The smart watch 200 may include a communication unit 210 and a processor 220.

The communication unit 210 performs a communication with the portable device 100 or an external device using various protocols and can transceive data using the same. The communication unit 210 can transmit and receive such a digital data as content and the like by accessing a network in wireless or wired. In the present specification, the smart watch 200 can perform a pairing with the portable device 100 using the communication unit 210. The smart watch 200 performs a pairing with the portable device 100 and can transmit an ID of the smart watch 200 to an external device using the portable device 100. The communication unit 210 receives an ID request signal from the portable device 100 or a neighboring external device and can transmit a response signal.

The processor 220 can receive data from the portable device 100 or the external device using the communication unit 210. And, the processor 220 can transmit the received data to a different external device.

According to the present specification, if the processor 220 receives an ID request signal from the portable device 100, the processor 220 can transmit a response signal to the portable device 100 in response to the ID request signal. In this case, the ID request signal is a signal transmitted by the portable device 100. More specifically, if the portable device 100 detects a control input for transmitting data to an external device, the portable device 100 can transmit the ID request signal to obtain an ID of the smart watch 200. As an example, if a pairing with the smart watch 200 is performed, the portable device 100 transmits the ID request signal to the smart watch 200 in a state of being paired with the smart watch and can obtain the ID of the smart watch 200. Moreover, the portable device 100 includes identification information of the smart watch 200, transmits the ID request signal to the smart watch 200 based on the identification information and can obtain the ID of the smart watch 200. As a different example, the portable device 100 selects a smart watch 200 transmitting an ID request signal based on a user input, transmits the ID request signal to the smart watch 200, and can obtain an ID of the smart watch 200.

And, if the smart watch 200 receives the ID request signal, the smart watch 200 can transmit a response signal to the portable device. In this case, the response signal may include the ID of the smart watch 200. In this case, the ID may correspond to unique identification information of the smart watch 200. In this case, the ID of the smart watch 200 may be identical to or different from an ID of the portable device 100.

And, the response signal may include information on the smart watch 200. As an example, the response signal may include information on data use of the smart watch 200, battery information, or information on availability.

If the portable device 100 receives the response signal, the portable device 100 can transmit the ID of the smart watch 200 included in the response signal to an external device. In this case, if the ID of the smart watch 200 and the ID of the portable device 100 are identical to each other, the portable device 100 can transmit the ID of the portable device 100 to the external device. In particular, since the ID of the smart watch 200 and the ID of the portable device 100 are identical to each other, the portable device can transmit the ID of the portable device only to the external device. Meanwhile, if the ID of the smart watch 200 and the ID of the portable device 100 are different from each other, the portable device 100 can transmit the ID of the smart watch 200 to the external device. In this case, the portable device 100 can transmit both the ID of the portable device 100 and the ID of the smart watch 200 to the external device. Thereafter, the portable device 100 can transceive data with the external device based on the ID of the smart watch 200. And, the portable device 100 can initiate a call with the external device based on the ID of the smart watch 200. Regarding this, it shall be described later.

Figure 3:
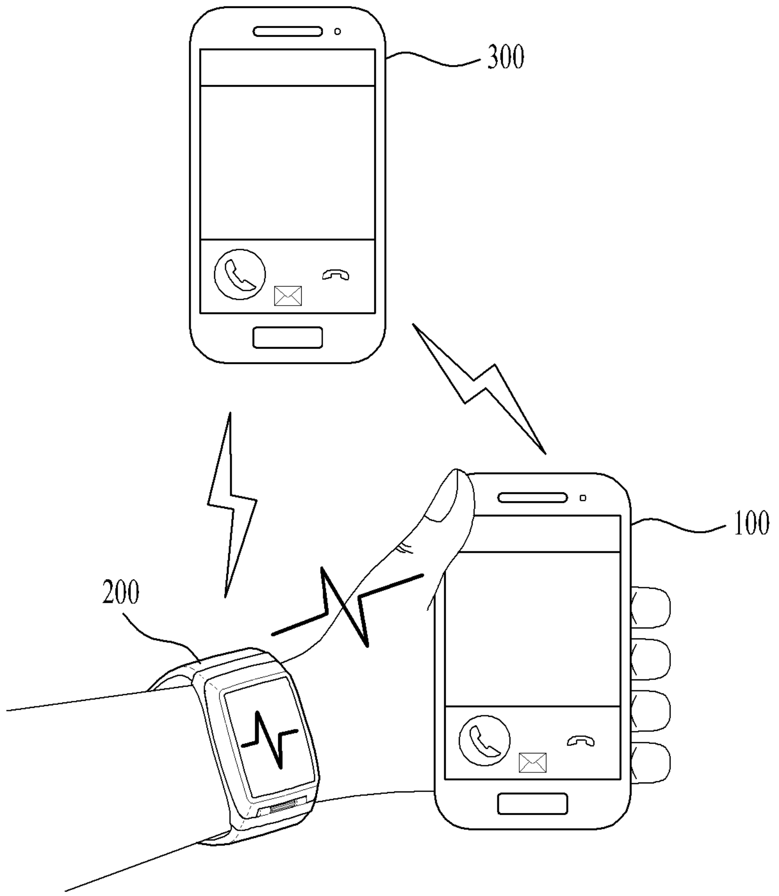
FIG. 3 is a diagram of a method for a portable device to transceive data with an external device according to one embodiment of the present specification in case that a user of the portable device and a user of a smart watch are different from each other.

FIG. 3 is a diagram of a method for a portable device 100 to transceive data with an external device 300 according to one embodiment of the present specification in case that a user of the portable device 100 and a user of a smart watch 200 are different from each other. The smart watch 200 can be used in a manner of being synchronized with the portable device 100. In this case, the user of the smart watch 200 and the user of the portable device 100 may be different from each other. In particular, the user of the smart watch 200 can transceive data with an external device 300 using the portable device of a different user. In this case, the portable device 100 can determine a user for transceiving data with the external device 300 among the user of the portable device 100 and the user of the smart watch 200.

More specifically, if the portable device 100 detects a control input for transmitting data to the external device 300, the portable device 100 can determine whether the data is transmitted to the external device 300 using an ID of the portable device 100 or an ID of the smart watch 200. In this case, the ID can include user information of each of the aforementioned devices. And, as an example, the ID may include unique identification information of each of the aforementioned devices. More specifically, the ID is information used for distinguishing one device from another. Each of the aforementioned devices may have a unique ID of its own.

As a further different example, the ID may correspond to user information on each of the portable device 100 and the smart watch 200. In this case, the user information can be modified by a user with a value predetermined to a device. And, as an example, the ID may correspond to a telephone number included in the portable device 100 and the smart watch 200. In particular, a telephone number stored in a smartphone or unique identification information of the smartphone may correspond to an ID. An ID may be non-limited to the aforementioned embodiment and information used for distinguishing devices from each other may correspond to the aforementioned ID. An external device 300 may receive data including an ID and may check a device transceiving data.

In this case, the aforementioned data may correspond to a visual data or an audio data. And, the data may include different data other than the visual data or the audio data, by which the aforementioned embodiment may be non-limited. And, according to the present specification, as an example, the data may correspond to a signal for the portable device 100 to initiate a call with the external device 300. More specifically, the portable device 100 can transmit a signal for initiating a call to the external device 300. In this case, if the external device 300 initiates a call, the portable device 100 can consistently exchange an audio data or a video data with the external device 300 until the call is ended. In particular, the call may indicate a state that a channel capable of transceiving an audio data or a visual data is formed between the portable device 100 and the external device 300. In this case, the portable device 100 may exchange one-time data or consistent data with the external device 300.

Figure 4A:
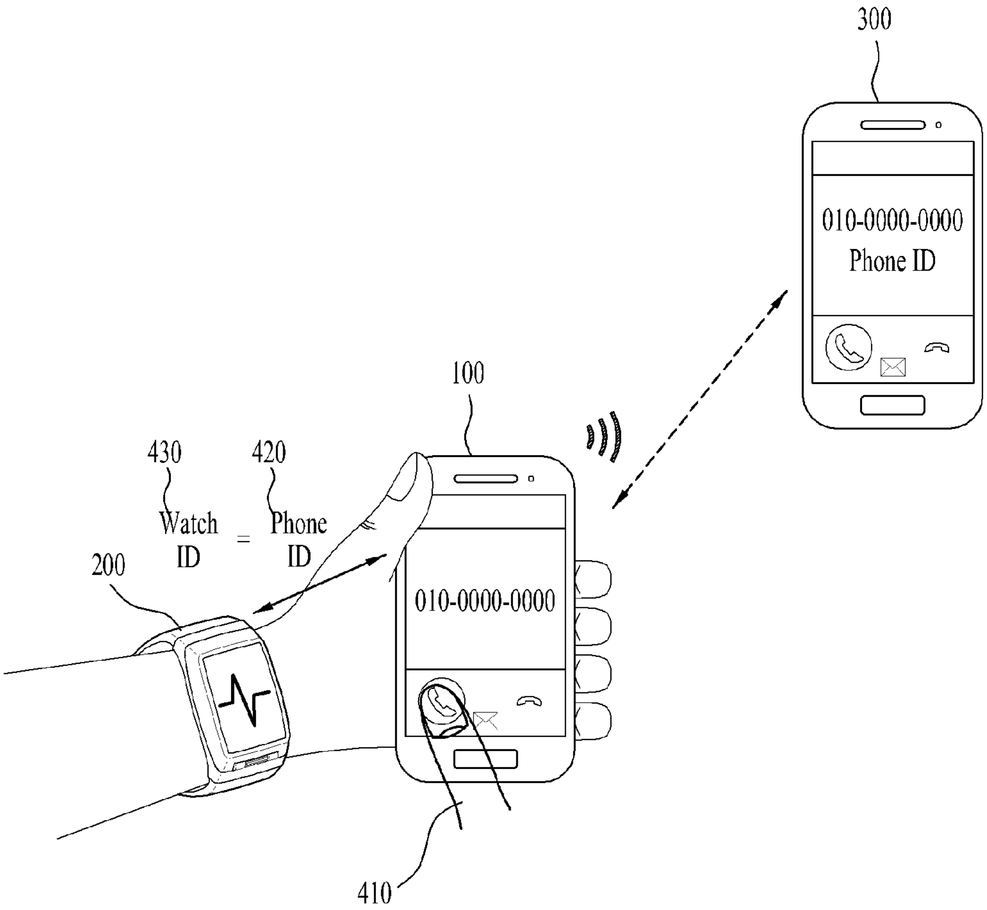
FIG. 4*a* to FIG. 4*c* is a diagram for a method for a portable device synchronized with a smart watch to transceive data with an external device according to one embodiment of the present specification.
Figure 4B:
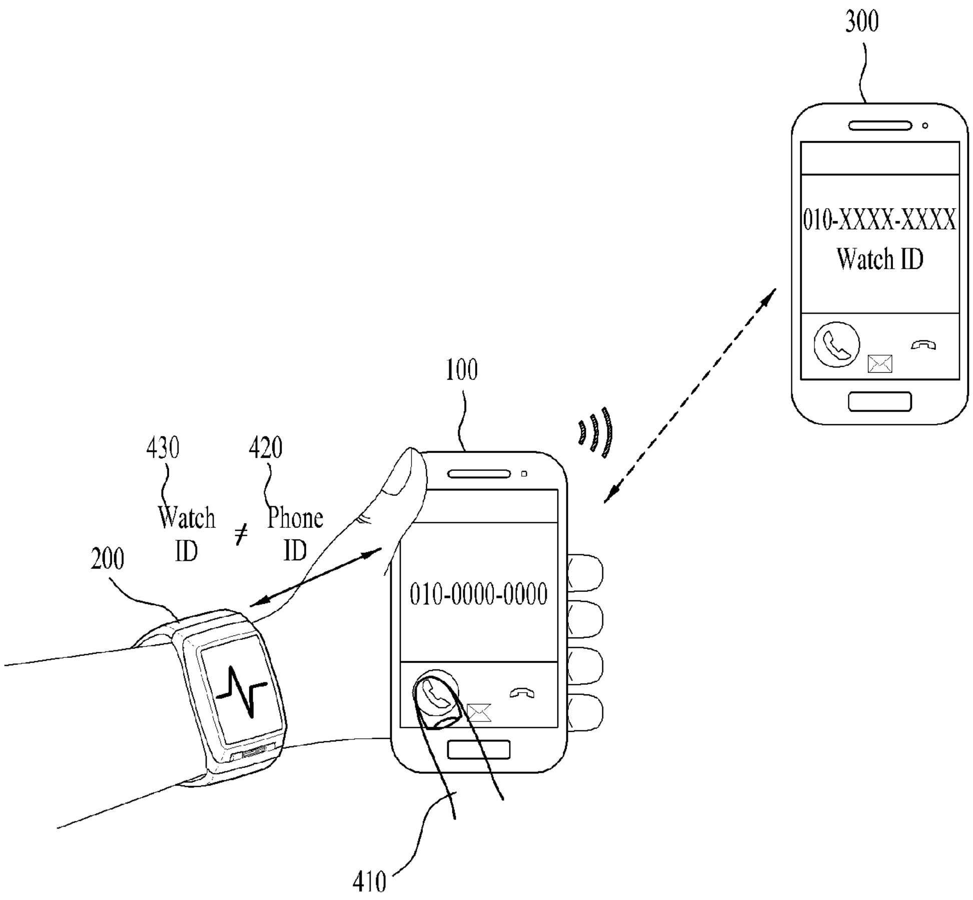
Figure 4C:
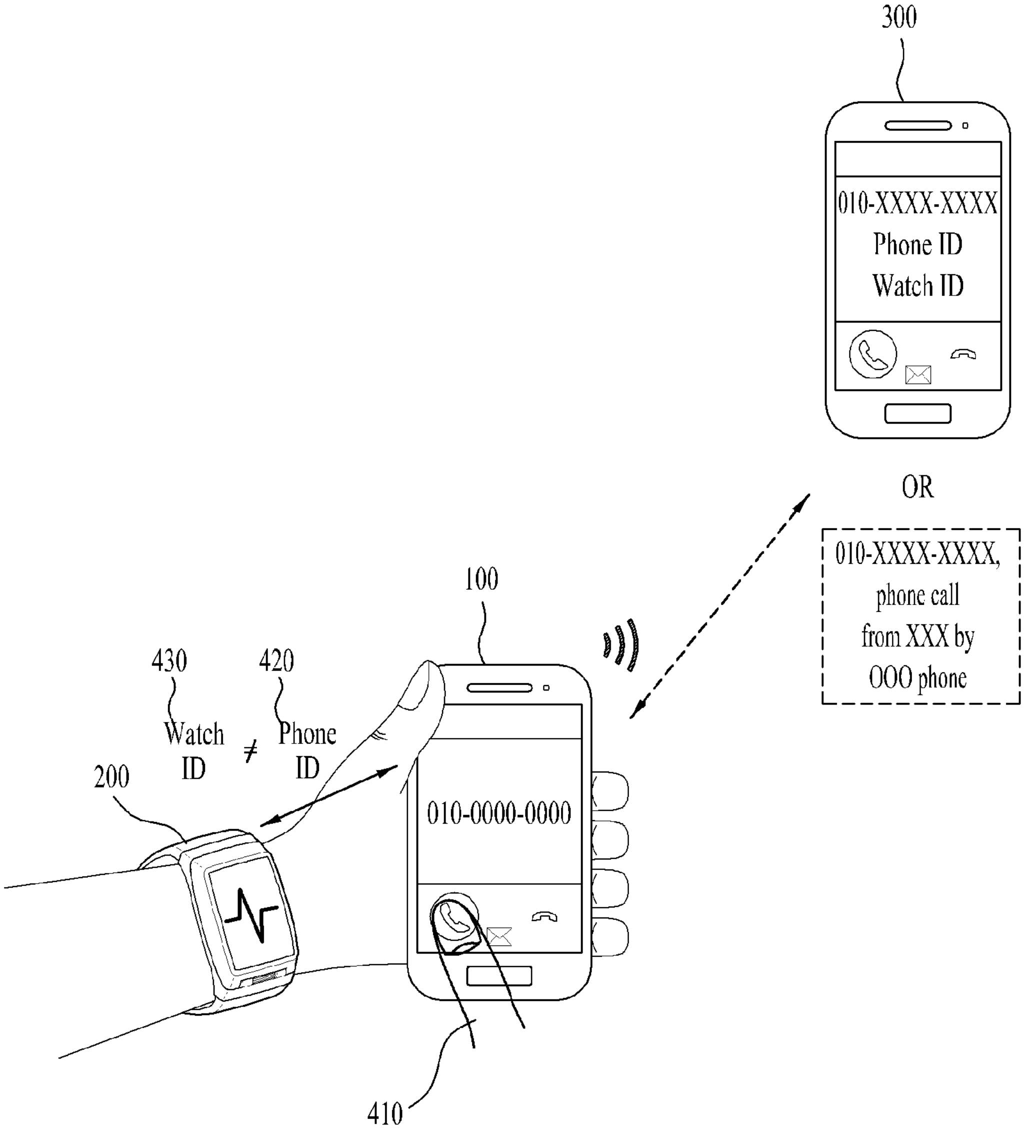

FIG. 4*a* to FIG. 4*c* is a diagram for a method for a portable device synchronized with a smart watch to transceive data with an external device according to one embodiment of the present specification. In this case, the portable device 100 may have a first ID 420. And, the smart watch may include a second ID and the external device 300 may include a third ID. In this case, as mentioned in the foregoing description, the first ID 420, the second ID 430, and the third ID may include unique identification information of each of the devices, respectively. More specifically, the unique identification information may correspond to user information, a telephone number, or other identification information of each of the devices.

The portable device 100 including the first ID 420 can transmit data to the external device including the third ID. In this case, if a control input for transmitting data is delivered to the portable device 100, the portable device 100 can detect the smart watch 200 including the second ID 430. And, as an example, the portable device 100 can detect the smart watch 200 according to a control input for detecting the smart watch 200 of a user without receiving the control input for transmitting data.

If the portable device 100 detects the smart watch 200, the portable device 100 can obtain the second ID 430 of the smart watch 200 using the communication unit. In this case, as an example, the portable device 100 can transmit an ID request signal to the smart watch 200 to detect the smart watch 200. In this case, the portable device 100 receives a response signal including the second ID 430 of the smart watch 200 and can obtain the second ID. And, as an example, the portable device 100 performs a pairing with the smart watch 200 and can obtain the second ID 430 of the smart watch 200 in a state of being paired with the smart watch. In particular, the portable device 100 can obtain the ID of the smart watch in a manner of being synchronized with the smart watch 200 via various protocols, by which the aforementioned embodiment may be non-limited.

If the portable device 100 receives the second ID 430 of the smart watch 200, the portable device 100 can compare the first ID 420 of the portable device with the second ID 430 of the smart watch 200. In this case, if the first ID 420 of the portable device and the second ID 430 of the smart watch 200 are identical to each other, the portable device 100 includes the first ID of the portable device 100 in ID information and can transmit data including the ID information to the external device 300. In particular, if both the portable device 100 and the smart watch 200 are used by an identical user, the portable device 100 can transmit the ID of the portable device only to the external device 300.

On the contrary, if the first ID 420 of the portable device and the second ID 430 of the smart watch 200 are different from each other, the portable device 100 includes the second ID 430 of the smart watch 200 in the ID information and can transmit data including the ID information to the external device 300. In particular, if the portable device 100 and the smart watch 200 are used by users different from each other, the portable device 100 can transmit information on the user of the smart watch 200 to the external device 300 in a manner of transmitting the second ID 430 of the smart watch 200 to the external device 300. And, as an example, the portable device 100 can transmit both the first ID 420 of the portable device 100 and the second ID 430 of the smart watch 200 to the external device 300.

More specifically, referring to FIG. 4*a*, the first ID 420 of the portable device 100 may be identical to the second ID 430 of the smart watch 200. As an example, if a user of the portable device 100 is identical to a user of the smart watch 200, the first ID 420 of the portable device 100 may be identical to the second ID 430 of the smart watch 200. In this case, if the portable device 100 receives a control input 410 for transmitting data of the user, the portable device 100 can detect the smart watch 200. Thereafter, the portable device 100 can obtain the second ID 430 from the detected smart watch 200. And, before the portable device 100 detects the control input 410 for transmitting data of the user, the portable device 100 can perform a pairing with the smart watch 200 and can be synchronized with the smart watch. In this case, the pairing can be performed via Bluetooth, NFC (near field communication), and the like. Regarding this, it shall be described later. If the portable device 100 performs the pairing with the smart watch 200, the portable device 100 can immediately obtain the second ID 430 of the smart watch 200 based on the pairing instead of detecting the smart watch according to the control input 410 for transmitting data of the user.

Subsequently, the portable device 100 can determine whether the first ID 420 of the portable device 100 is identical to the second ID 430 of the smart watch 200. In this case, if the first ID 420 is identical to the second ID 430, the portable device 100 includes the first ID 420 in ID information and can transmit data including the ID information to the external device 300.

In particular, if the portable device 100 and the smart watch 200 include an identical ID, the portable device 100 can transmit the ID information including the first ID of the portable device 100 only to the external device 300.

In this case, the ID information may include at least one of the aforementioned first ID 420 of the portable device and the second ID 430 of the smart watch 200. And, the ID information may include detailed information on the aforementioned devices. As an example, the ID information may include information on a device type of the portable device 100. And, as an example, the ID information may include information on a communication protocol of the portable device 100. By doing so, in case that the portable device 100 exchanges data with the external device 300, the portable device 100 can consistently check a communication state.

The external device 300 can receive data transmitted by the portable device 100. If the external device 300 receives the data including the first ID 420 of the portable device 100, the external device 300 can display the first ID 420 of the portable device 100 and information on the portable device 100. And, the external device 300 can transmit a reply data to the portable device 100 in accordance with the data including the first ID 420.

And, as an example, if the external device 300 receives the data including the first ID 420 of the portable device 100, the external device 300 can connect a channel for consistently exchanging data with the portable device 100. More specifically, the portable device 100 transmits a call initiation signal to the external device 300 as the data including the first ID 420 and the external device 300 can receive the call initiation signal. If the external device 300 receives the call initiation signal, the portable device 100 can consistently exchange an audio data or a visual data with the external device in a manner of initiating a call with the external device 300.

Referring to FIG. 4*b*, the first ID 420 of the portable device 100 may be different from the second ID 430 of the smart watch 200. As an example, if a user of the portable device 100 is different from a user of the smart watch 200, the portable device 100 may have the first ID 420, which is different from the second ID 430 of the smart watch 200. In particular, if the user of the smart watch 200 transmits data to the external device 300 using the portable device 100 of a different user, the first ID 420 of the portable device 100 may be different from the second ID 430 of the smart watch 200.

More specifically, if the portable device 100 receives a control input 410 for transmitting data to the external device 300 from a user, the portable device 100 can detect the smart watch 200. Subsequently, the portable device 100 can obtain the second ID 430 from the detected smart watch 200. In this case, as an example, before the portable device 100 detects the control input 410 for transmitting the data of the user, the portable device 100 can perform a pairing with the smart watch 200. If the portable device 100 performs the pairing with the smart watch 200, the portable device 100 can immediately obtain the second ID 430 of the smart watch 200 instead of detecting the smart watch 200 in accordance with the control input 410 for transmitting the data of the user.

Subsequently, the portable device 100 can compare the first ID 420 of the portable device 100 with the second ID 430 of the smart watch 200 to find out whether the first ID is identical to the second ID. In this case, if the first ID 420 of the portable device 100 is different from the second ID 430 of the smart watch 200, the portable device 100 includes the second ID 430 of the smart watch 200 in ID information and can transmit data including the ID information to the external device 300. In particular, the portable device 100 can transmit the second ID 430 of the smart watch 200 only to the external device 300. By doing so, a user of the external device 300 can check that a user of the smart watch 200 transmits data using the portable device 100 of a different user. And, as an example, the portable device 100 can transmit both the second ID 430 of the smart watch 200 and the first ID 420 of the portable device 100 to the external device 300. By doing so, the external device 300 can obtain both information on the user of the smart watch 200 and information on the user of the portable device 100.

The external device 300 can receive data transmitted by the portable device 100. If the external device 300 receives data including the second ID 430 of the smart watch 200, the external device 300 can display the second ID 430 of the smart watch 200 and information on the smart watch 200. By doing so, a user of the smart watch 200 can transceive data with the external device 300 via the portable device 100 of a different user. And, a user of the external device 300 can check that data is transceived with the user of the smart watch 200 by receiving the second ID 430 of the smart watch 200.

And, as an example, the portable device 100 can transmit a call initiation signal to the external device 300 as data including the second ID 430 of the smart watch 200. In particular, the external device 300 can connect a channel used for consistently exchanging data with the portable device 100 based on the second ID 430. In this case, the portable device 100 can exchange the data with the external device 300 based on the second ID 430 of the smart watch 200. More specifically, the portable device 100 transmits the call initiation signal to the external device 300 as the data including the second ID 430 and the external device 300 can receive the call initiation signal. By doing so, a user of the smart watch 200 can exchange an audio data or a visual data with the external device in a manner of calling with the external device 300 via the portable device 100 of a different user. And, as an example, if the portable device 100 makes a call with the user of the smart watch 200 and the user of the external device 300 based on the second ID, data usage charge can be moved to the smart watch 200.

As a further different example, referring to FIG. 4*c*, if the first ID 420 of the portable device 100 is different from the second ID 430 of the smart watch 200, the portable device 100 includes the first ID of the portable device 100 and the second ID 430 of the smart watch 200 in ID information and can transmit data including the ID information to the external device. And, as an example, the portable device 100 can display the first ID 420 of the portable device 100 and the second ID 430 of the smart watch 200. In this case, the portable device 100 selects the first ID 420 of the portable device 100 or the second ID 430 of the smart watch 200 according to a control input of a user and can transmit the selected ID to the external device 300.

If the external device 300 receives the ID information including the first 420 and the second ID 430, the external device 300 can display the first 420 and the second ID 430. By doing so, a user of the external device 300 can check that a user of the smart watch 200 transmits data to the portable device 100. And, as an example, the external device 300 can display additional information together with the first 420 and the second ID 430. In this case, the additional information may correspond to information used by the user of the external device 300 to check a device transmitting the data.

And, as an example, the portable device 100 can configure the aforementioned cases into modes. More specifically, if the first ID 420 of the portable device 100 is different from the second ID 430 of the smart watch 200, a case for the portable device 100 to transmit the data including the second ID 430 only can be configured as a first mode. The portable device 100 may relay a data exchange between the smart watch 200 and the external device 300 via the first mode. In this case, the portable device 100 obtains information stored in the smart watch 200 via the communication unit 130 and can transmit the information of the smart watch 200 to the external device 300. In particular, the portable device 100 can relay the data exchange between the smart watch 200 and the external device 300.

And, if the first ID 420 of the portable device 100 is different from the second ID 430 of the smart watch 200, a case for the portable device 100 to transmit the data including the first ID 420 and the second ID 430 can be configured as a second mode. The portable device 100 can simultaneously transmit information of the smart watch 200 and information of the portable device 100 via the second mode. In particular, the portable device 100 can relay the data exchange between the smart watch 200 and the external device 300 and can exchange the information of the portable device as well.

FIG. 5*a* to FIG. 5*d* is a diagram of a method for a portable device to detect a smart watch according to one embodiment of the present specification. More specifically, having obtained a control input 410 of a user, the portable device 100 can detect the smart watch 200. If the second ID 430 of the smart watch 200 is different from the first ID 420 of the portable device, the portable device 100 detects the smart watch 200 and can obtain second ID 430 information from the detected smart watch 200. In particular, if a user of the smart watch 20 transmits data to an external device 300 using the portable device 100 of a different user, the user of the smart watch 200 preferentially detects the smart watch 200 of the user via the portable device 100 and can obtain the second ID 430 using the portable device 100. Hence, having detected the control input 410 for transmitting data of the user, the portable device 100 detects the smart watch 200 and can obtain the second ID 430.

Figure 5A:
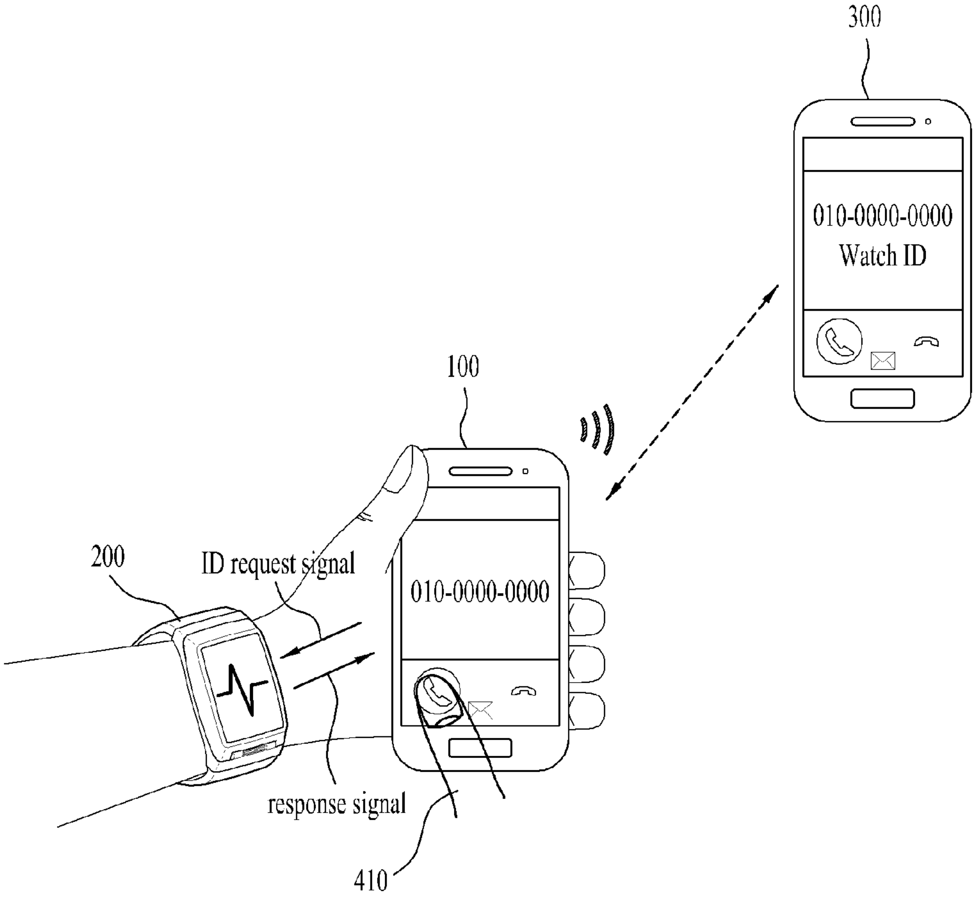
FIG. 5*a* to FIG. 5*d* is a diagram of a method for a portable device to detect a smart watch according to one embodiment of the present specification.

In relation to this, referring to FIG. 5*a*, having detected the control input 410 for transmitting data of the user, the portable device 100 can transmit an ID request signal to the smart watch 200 to detect the smart watch 200. In this case, as mentioned in the foregoing description, the ID request signal may correspond to a signal for making a request for an ID to the smart watch 200. As an example, the portable device 100 can transmit the ID request signal to the smart watch 200 only. In this case, the portable device 100 has identification information of the smart watch 200 and can transmit the ID request signal to the smart watch only based on the identification information. And, the portable device 100 can detect a user input for transmitting the ID request signal. In this case, the user can select the smart watch 200 as a device to transmit the ID request signal. By doing so, the portable device 100 can transmit the ID request signal to the smart watch 200 only.

If the portable device 100 transmits the ID request signal to the smart watch 200, the smart watch 200 can transmit a response signal to the portable device 100. In this case, the response signal is a signal transmitted in response to the ID request signal and may correspond to a signal transmitted to the portable device 100 by the smart watch 200. And, the response signal may include the second ID 430. And, as an example, the response signal may include data stored in the smart watch 200. More specifically, a user of the smart watch 200 includes the data in the response signal according to a control input and can transmit the data to the portable device 100. And, as an example, the portable device 100 receives the response signal and can be synchronized with the smart watch 200 based on the response signal. Subsequently, the portable device 100 can obtain a second ID from the synchronized smart watch 200. And, as an example, the smart watch 200 includes predetermined identification information and can transmit the response signal to the portable device 100 only base on the predetermined identification information.

Having received the response signal, the portable deice 100 can obtain the second ID 430. And, as an example, having received the response signal, the portable device 100 can obtain data stored in the smart watch 200. Subsequently, the portable device 100 can exchange the data with an external device 300 based on the second ID 430. And, the portable device 100 can transmit the data received from the smart watch 200 to the external device 300.

Figure 5B:
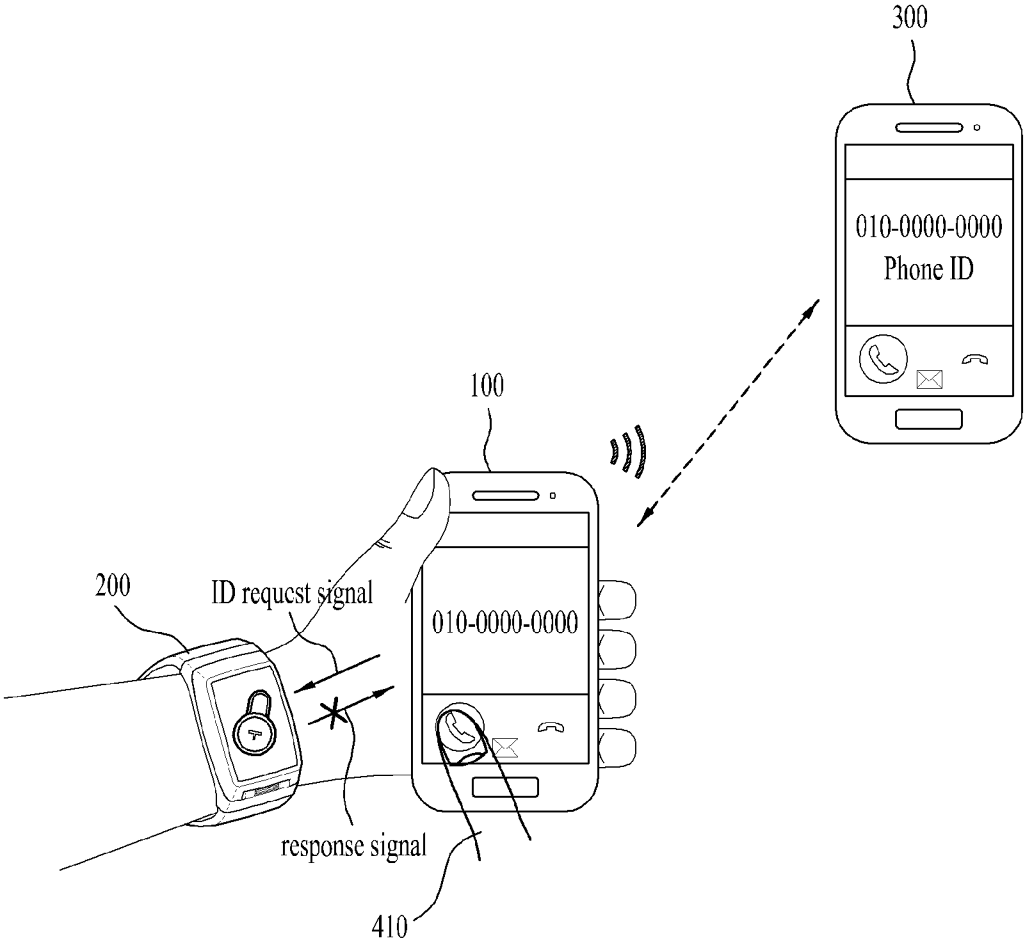

As a different example for the portable device 100 to detect the smart watch 200, referring to FIG. 5*b*, the portable device 100 may not receive a response signal from the smart watch 200. More specifically, the smart watch 200 receives an ID request signal from the portable device 100 and may not transmit a response signal to the portable device 100. As an example, the smart watch 200 can be set to a lock mode not transmitting the second ID 430 to the portable device 100 according to a control input of a user. By doing so, the user of the smart watch 200 can prevent the portable device 100 from using the smart watch 200 indiscreetly.

If the portable device 100 does not receive a response signal from the smart watch 200, the portable device includes a first ID 420 of the portable device 100 in ID information and can transmit data including the first ID to an external device 300. In particular, the portable device 100 can exchange the ID of the portable device 100 and information of the portable device 100 only with the external device 300.

Figure 5C:
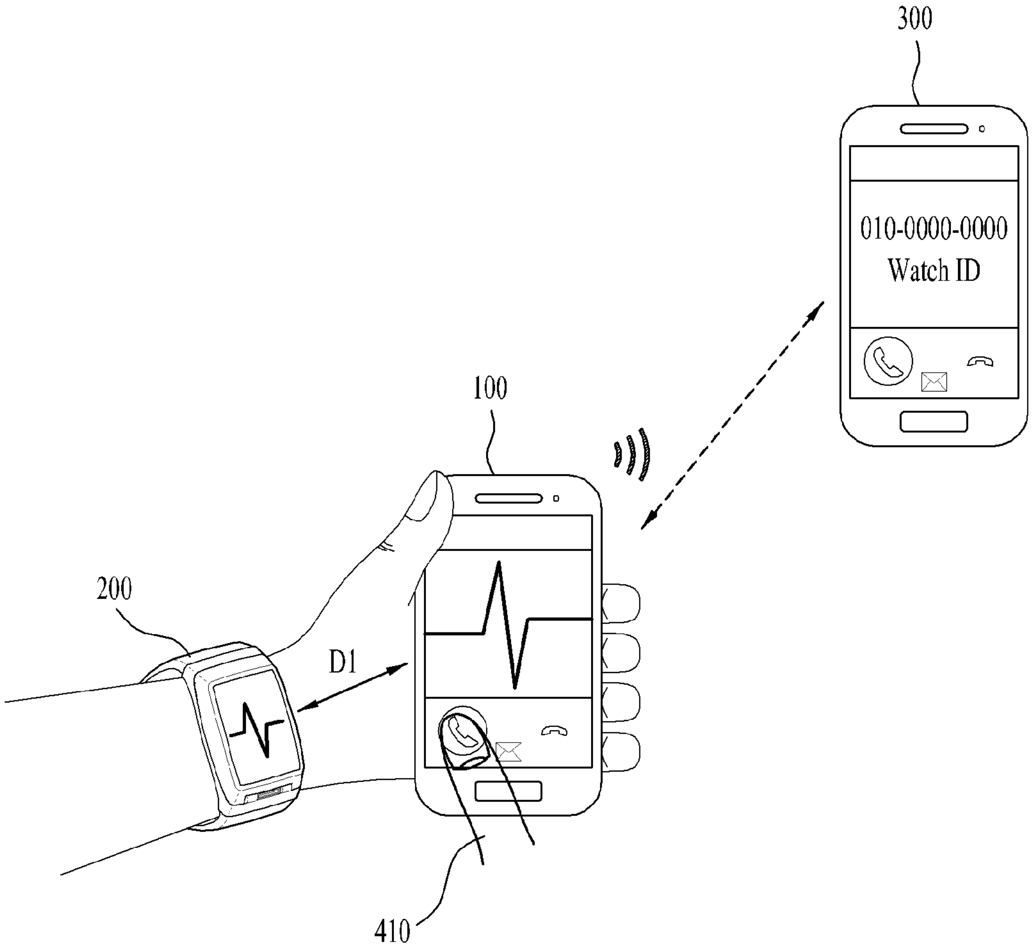

As a further different example for the portable device 100 to detect the smart watch 200, referring to FIG. 5*c*, the portable device 100 can perform a pairing with the smart watch 200. In this case, the pairing can be performed via Bluetooth, NFC (near field communication), or the like. As an example, the pairing can be performed by a user input via the portable device 100 or the smart watch 200. In this case, the user input may include a touch input, an audio input, and the like. By doing so, the portable device 100 performs a communication access with the smart watch 200 and can transceive data with the smart watch 200 in a state that a session is opened. And, as an example, the pairing can be performed in case that the portable device 100 and the smart watch 200 are positioned within a threshold distance. In this case, if the portable device 100 and the smart watch 200 are positioned within the threshold distance, the portable device 100 can transmit a request signal for making a request for a pairing to the smart watch 200. In this case, the pairing can be performed in a manner that the smart watch 200 transmits a response signal in response to the request signal. In this case, the threshold distance can be set to have a prescribed error range.

In case that the pairing between the portable device 100 and the smart watch 200 is performed, the portable device 100 may not detect the smart watch 200. In particular, having detected a control input 410 for transmitting data, the portable device 100 does not detect the smart watch 200 and can immediately obtain a second ID 430 from the smart watch that is paired with the portable device. By doing so, the portable device 100 can exchange data with an external device 300 based on the second ID 430.

Figure 5D:
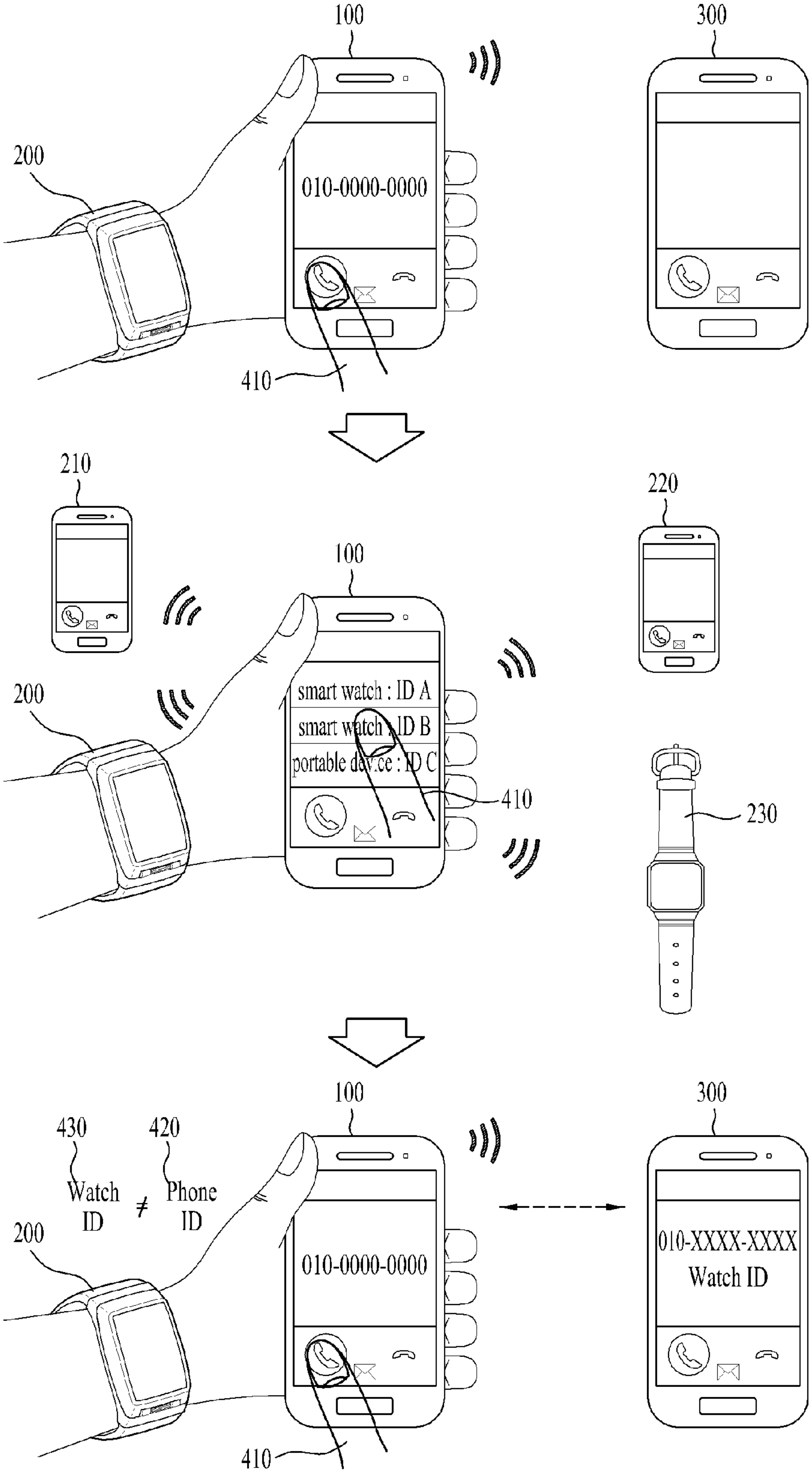

As a different example for the portable device 100 to detect the smart watch 200, referring to FIG. 5*d*, the portable device 100 can detect the smart watch 200 from a plurality of neighboring devices. More specifically, having detected a control input 410 for transmitting data, the portable device 100 can detect the smart watch 200. In this case, the portable device 100 can transmit a device search signal to the smart watch 20 and a plurality of the neighboring devices positioned within a threshold distance. As an example according to the present specification, if there exist a plurality of devices around the smart watch 200, the portable device 100 may not detect the smart watch 200. Hence, the portable device 100 can transmit a device search signal to the neighboring devices 210/220/230 to detect the smart watch 200. In this case, the device search signal may correspond to Bluetooth, NFC (near field communication), and the like. The portable deice 100 can transmit the device search signal to all devices 210/220/230 positioned near the portable device. Having transmitted the device search signal to the devices positioned near the portable device, the portable device 100 can detect the smart watch 200 and the neighboring devices 210/220/230 positioned within a threshold distance. In this case, the portable device 100 can generate a list including the detected smart watch 200 and the devices 210/220/230 positioned near the portable device. In this case, the portable device 100 can detect the smart watch 200 by a control input of a user selecting the smart watch 200. By doing so, the portable device 100 can obtain a second ID 430 of the smart watch 200. In particular, the portable device 100 selects the smart watch 200 only via the list of the devices positioned near the portable device and can obtain the second ID 430.

And, as an example, the portable device 100 may obtain an ID of a different device according to a user input to select the different device. In this case, the neighboring device including the ID can exchange data with an external device 300 via the portable device 100. In particular, data exchange with the external device 300 performed by using the portable device 100 may be non-limited to the smart watch 200. If a neighboring device includes an ID and exists within a threshold distance from the portable device 100, the portable device can exchange data with the external device 300 based on the ID of the neighboring device.

Figure 6:
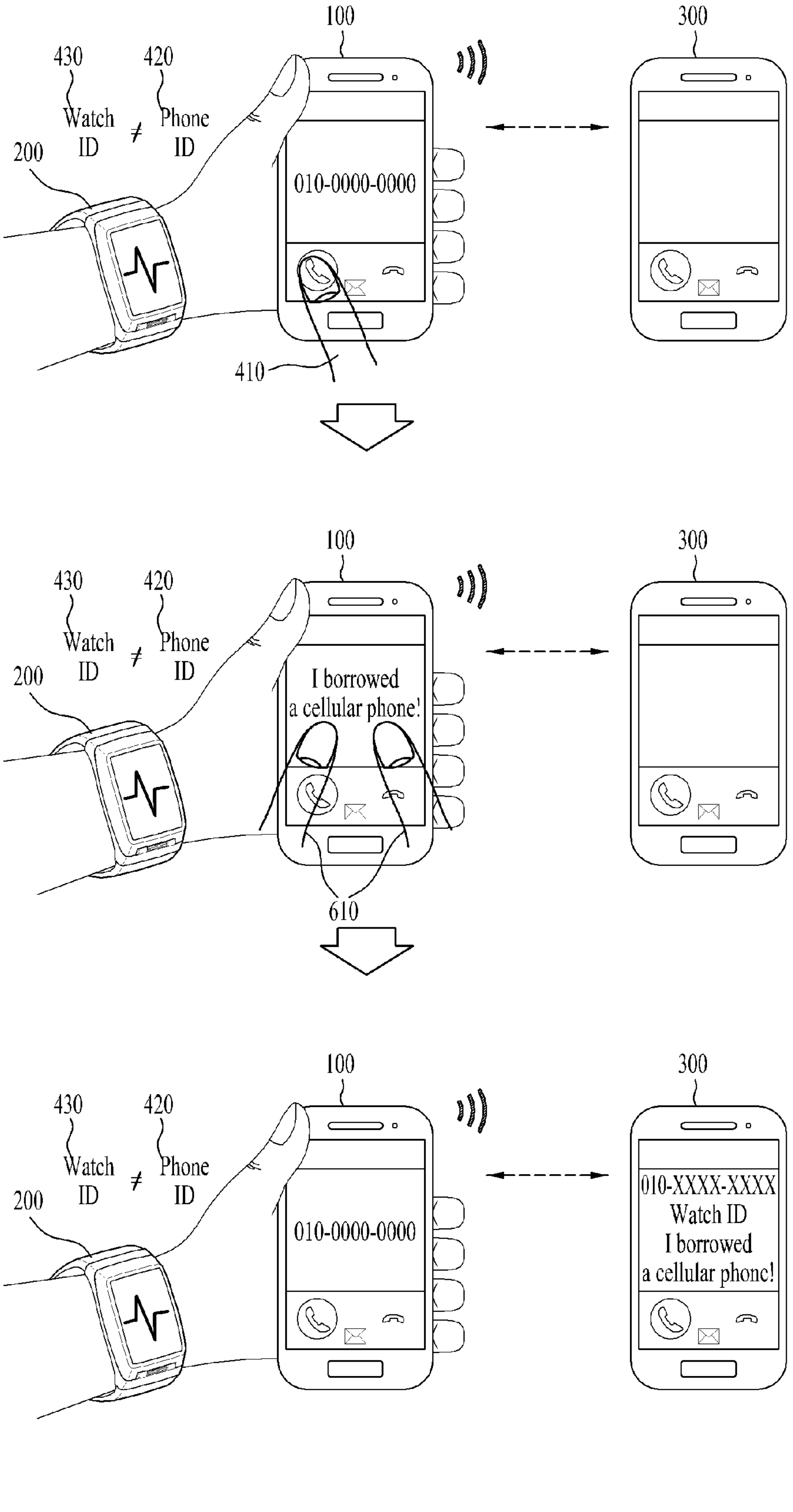
FIG. 6 is a diagram of a method for a portable device to additionally transmit a message according to one embodiment of the present specification in case that the portable device transmits a second ID of a smart watch to an external device.

FIG. 6 is a diagram of a method for a portable device 100 to additionally transmit a message according to one embodiment of the present specification in case that the portable device 100 transmits a second ID 430 of a smart watch 200 to an external device 300. Referring to FIG. 6, if a first ID 420 of the portable device 100 and a second ID 430 of the smart watch 200 are different from each other, the portable device 100 can transmit the second ID 430 to the external device 300 according to a control input 410 for a user to transmit data. In this case, the portable device 100 can transmit both the second ID 430 and information on the smart watch 200 to the external device 300. And, having detected a control input 610 for a user to input a message, the portable device 100 generates a message and can transmit the message together with data including the second ID to the external device 300. In this case, as an example, having detected a control input 410 for the user to transmit data, the portable device 100 detects the control input 610 for the user to input a message, generates the message, and can transmit the message to the external device 300. And, as an example, after detecting the control input 610 for the user to input a message and generating the message, the portable device 100 can detect the control input 410 for the user to transmit data. By doing so, the portable device 100 can transmit the message to the external device 300 together with the data including the second ID 430. And, having received both the data including the second ID 430 and the message, the external device 300 can display the second ID 430 and the message. By doing so, a user of the external device 300 can obtain additional information on a device for exchanging data with the external device 300. And, a user of the smart watch 200 can inform the user of the external device 300 that data is transmitted to the external device 300 via the portable device 100.

More specifically, a user of the smart watch 200 can initiate a call with an external device 300 using the portable device 100 of a different user. In this case, the user of the smart watch 200 can transmit a message together with a signal for initiating the call to the portable device 100 of the different user and the external device 300. As an example, the user of the smart watch 200 generates a message like 'I borrowed a cellular phone' by the portable device of the different user and can transmit the generated message to the external device 300 together with the call initiation signal based on a second ID 430. In this case, having received the message together with the call initiation signal including the second ID 430, the external device 300 can display the second ID 430 and the message. By doing so, a user of the external device 300 can check that the user of the smart watch 200 has called to the user of the external device 300 using the portable device 100 of the different user.

Figure 7:
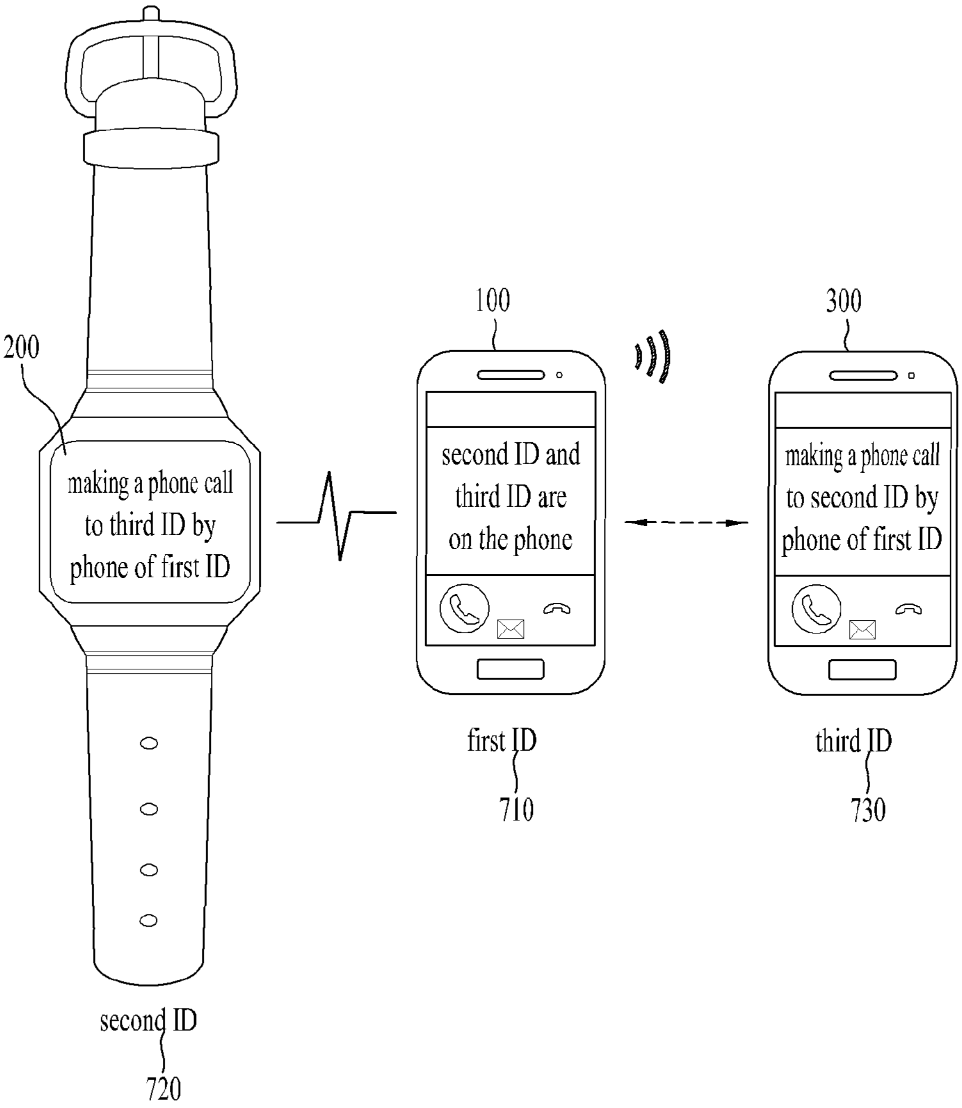
FIG. 7 is a diagram of a method for a portable device to deliver a feedback signal to a smart watch according to one embodiment of the present specification in case that the portable device transmits a second ID of the smart watch to an external device.

FIG. 7 is a diagram of a method for a portable device 100 to deliver a feedback signal to a smart watch 200 according to one embodiment of the present specification in case that the portable device 100 transmits a second ID 430 of the smart watch 200 to an external device 300.

Referring to FIG. 7, the portable device 100 includes a first ID 710, the smart watch includes a second ID 720, and the external device 300 includes a third ID 730. In this case, if the first ID 710 of the portable device 100 is different from the second ID 720 of the smart watch 200, the portable device 100 can transmit data including the second ID 720 to the external device 300. More specifically, the portable device 100 can transmit a call initiation signal including the second ID 720 to the external device 300. And, the external device 300 receives the call initiation signal including the second ID 720 and can initiate a call with a user of the smart watch 200 based on the second ID 720. In particular, the user of the smart watch 200 can make a call with a user of the external device 300 using the portable device 100 of a different user. In this case, as an example, the user of the smart watch 200 may bear a charge for the call initiation. And, as an example, in case that the smart watch 200 and the portable device 100 are initiating a call, the portable device 100 and the smart watch 200 may be in a state of being synchronized or paired with each other.

In this case, it is necessary for the smart watch 200 to check whether a call with the external device 300 is consistently maintained using the portable device 100. Hence, having transmitted data including the second ID 720 of the smart watch 200 to the external device 300, the portable device 100 can transmit a feedback signal to the smart watch 200. In this case, the feedback signal may correspond to a signal using Bluetooth or NFC. Having received the feedback signal from the portable device 100, the smart watch 200 can deliver feedback information to a user based on the feedback signal. As an example, a feedback may include at least one selected from the group consisting of a visual feedback, an audio feedback, and a tactile feedback. More specifically, the smart watch 200 can display the feedback information. In this case, the smart watch 200 can display information indicating that the second ID of the smart watch 200 is transmitted to the external device 300 using the portable device 100. And, as an example, the smart watch 200 can deliver a tactile feedback to a user whenever the portable device 100 transmits data including the second ID 720 to the external device 300. By doing so, a user of the smart watch 200 can check that the data including the second ID 720 is transmitted from the portable device 100 to the external device 300.

And, as one embodiment, having transmitted the data including the second ID 720 to the external device 300, the portable device 100 can deliver a feedback to a user. In this case, the feedback may include at least one selected from the group consisting of a visual feedback, an audio feedback, and a tactile feedback.

And, as one embodiment, having received the data including the second ID 720 from the portable device 100, the external device 300 can deliver a feedback to a user of the external device 300. In this case, the feedback may include at least one selected from the group consisting of a visual feedback, an audio feedback, and a tactile feedback.

Figure 8A:
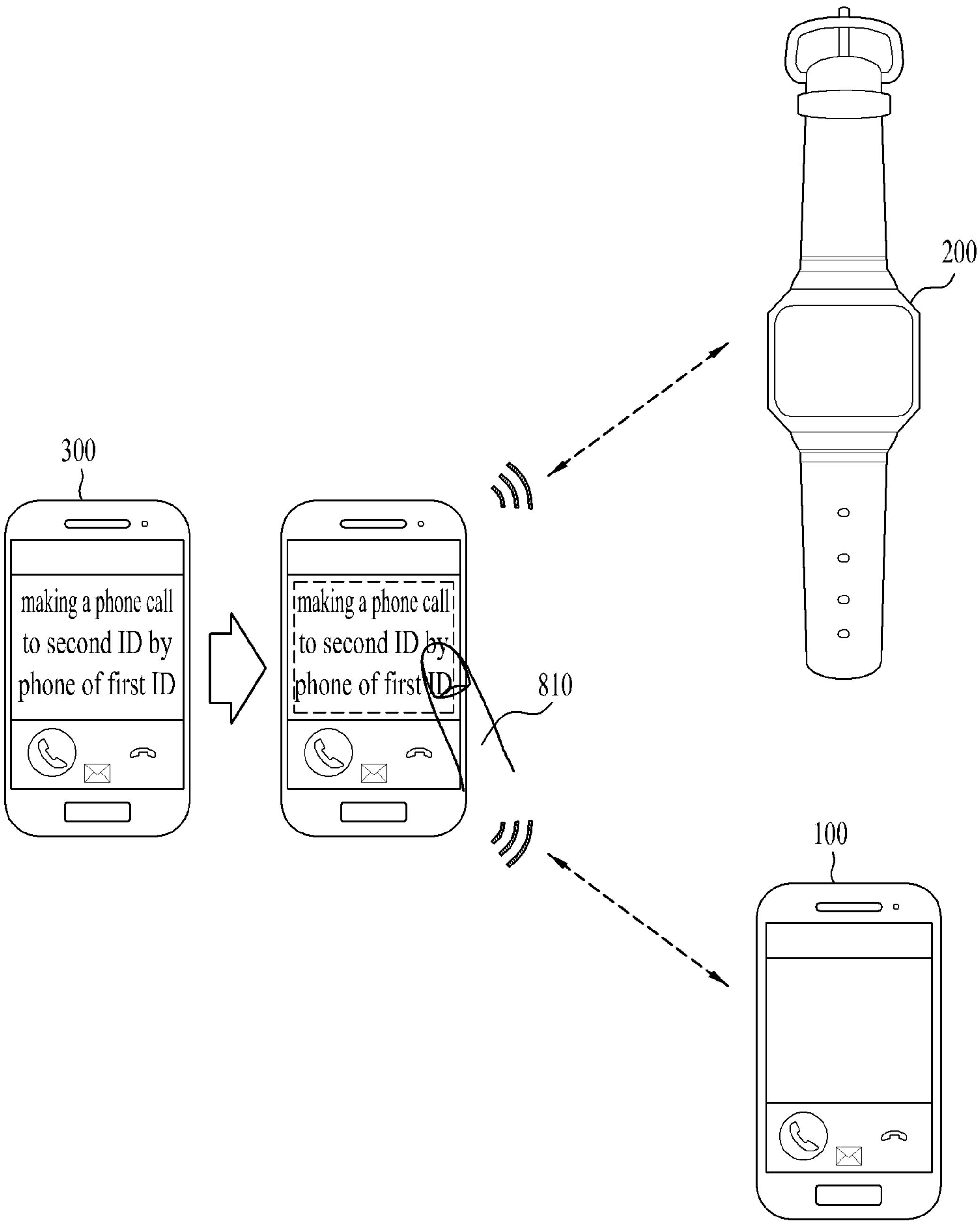
FIG. 8*a* to FIG. 8*c* is a diagram of a method for an external device to transmit a reply data based on a data transmitted by a portable device.
Figure 8B:
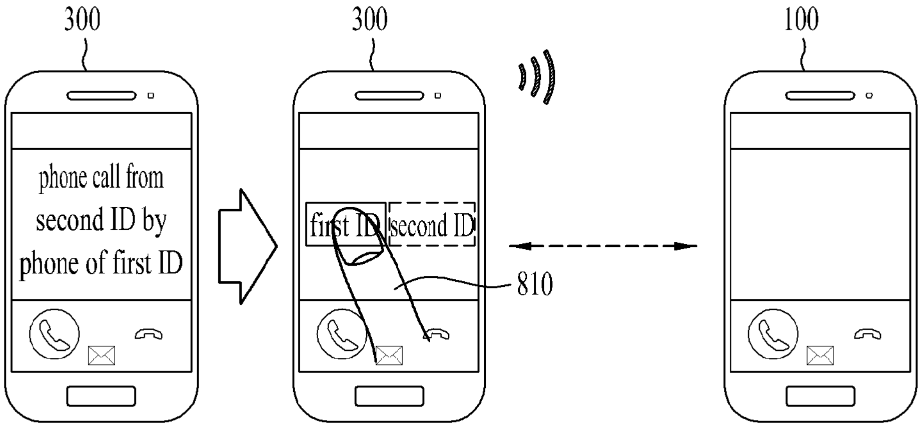

FIG. 8*a* to FIG. 8*b* is a diagram of a method for an external device 300 to transmit a reply data based on a data transmitted by a portable device 100.

As one embodiment, the external device 300 receives data from the portable device 100 and can transmit a reply data based on the received data. In this case, the reply data may correspond to a confirmation message used for confirming that the external device 300 has received the data from the portable device 100. And, as an example, in case that a call is initiated between the portable device 100 and the external device 300, the reply data may correspond to an audio data or a visual date transmitted to the portable device 100. In particular, the data transmitted to the portable device 100 by the external device 300 may correspond to the aforementioned replay data. And, the replay data may correspond to a call initiation signal transmitted by the external device 300 in response to a signal received from the portable device when the external device is not available. More specifically, if the external device 300 fails to receive the call initiation signal including the second ID 720 transmitted by the portable device 100, the external device 300 can display information on the failure of the call. In this case, the external device 300 can display a first ID 710 of the portable device 100 and the second ID 720 of the smart watch 200. The external device 300 can transmit a call initiation signal to the portable device 100 or the smart watch 200 based on the information on the failure of the call. In this case, the call initiation signal transmitted to the portable device 100 or the smart watch 200 by the external device 300 may correspond to the replay data.

More specifically, referring to FIG. 8*a*, the external device 300 can display data received from the portable device 100. If the first ID 710 of the portable device 100 is different from the second ID of the smart watch 200, the portable device 100 can transmit data including the second ID 720 of the smart watch 200 to the external device 300. In this case, the external device 300 can display the data including the second ID. The external device 300 can detect a control input 810 for a user to transmit a reply data based on the displayed data. Having detected the control input for the user to transmit the reply data, the external device 300 can transmit the reply data to the portable device 100. And, as an example, having detected the control input to transmit the replay data, the external device 300 can transmit the replay data to the smart watch 200. And, as an example, having detected the control input to transmit the replay data, the external device 300 can transmit the reply data to the smart watch 200 and the portable device 100. In particular, in case that the external device 300 transmits the replay data, the external device 300 can transmit the reply data to at least one of the portable device 100 including the first ID 710 ad the smart watch 200 including the second ID 720.

In this case, as an example, having transmitted the reply data to the portable device 100 including the first ID 710, the external device 300 can transmit the reply data including a third ID 730 of the external device 300 and the second ID 720 of the smart watch 200 to the portable device 100. By doing so, a user of the portable device 100 can deliver the reply data to the smart watch 200 based on the reply data received from the external device 300.

More specifically, as one embodiment, the portable device 100 can transmit a call initiation signal including the second ID 720 to the external device 300. In this case, if the external device 300 fails to make a call based on the call initiation signal, the external device 300 can display information on the call made when the external device is not available. In this case, the external device 300 can transmit a call initiation signal to the portable device based on the displayed information. In this case, the call initiation signal may include the third ID 730 of the external device 300 and the second ID 720 of the smart watch 200. By doing so, the portable device 100 can check information of calling out the smart watch 200 from the external device 300.

Figure 8C:
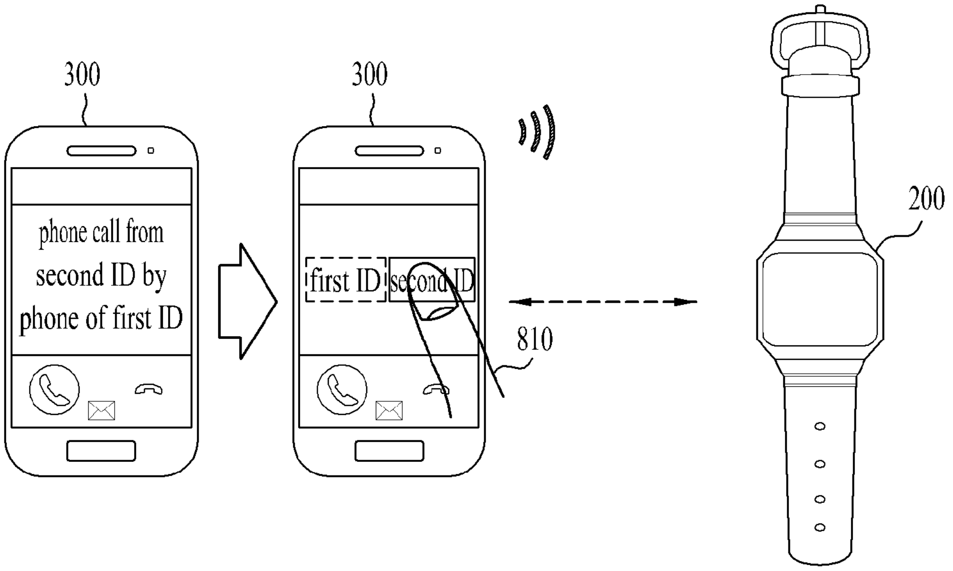

As a different example, referring to FIG. 8*b* and FIG. 8*c*, the external device 300 can detect a control input 810 for a user to select a device for transmitting the reply data. As an example, having received data including the second ID 720 from the portable device 100, the external device 300 can transmit the replay data in a manner of selecting the portable device 100 or the smart watch 200. In this case, the external device 300 can detect the control input 810 to select the portable device 100 or the smart watch 200. Having detected the control input 810 to transmit the replay data to the portable device 100, the external device 300 transmits the reply data to the portable device 100. And, having detected the control input 810 to transmit the replay data to the smart watch 200, the external device 300 transmits the reply data to the smart watch 200. And, as an example, the external device 300 can detect the control input 810 to simultaneously transmit the reply data to both the portable device 100 and the smart watch 200. In this case, the external device 300 can transmit the reply data to both the portable device 100 and the smart watch 200 at the same time.

Figure 9:
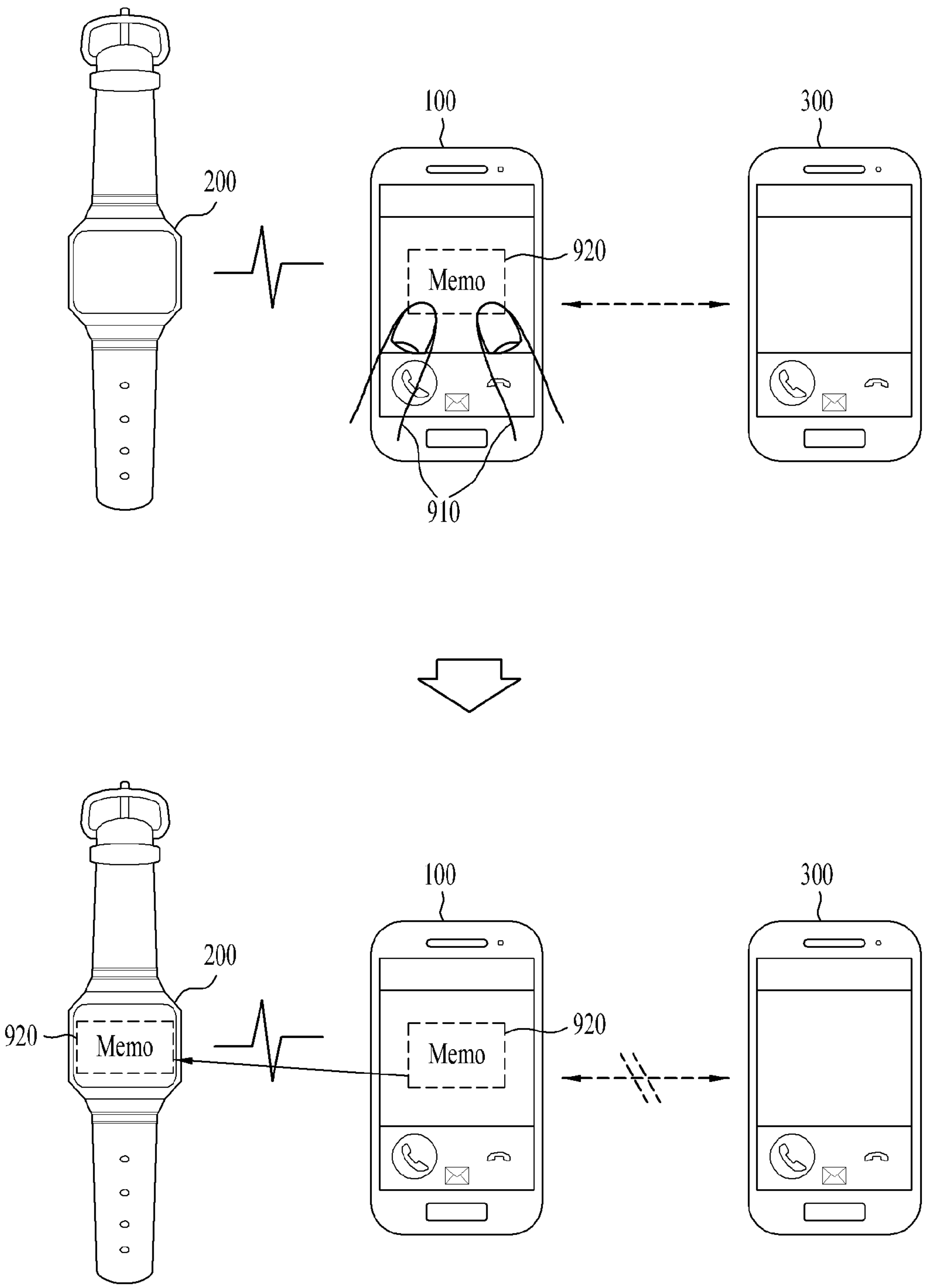
FIG. 9 is a diagram of a method for a portable device to transmit a memo generated in the portable device 100 to a smart watch in case that the portable device transmits data including a second ID to an external device.

FIG. 9 is a diagram of a method for a portable device 100 to transmit a memo generated in the portable device 100 to a smart watch in case that the portable device transmits data including a second ID to an external device.

Referring to FIG. 9, the portable device 100 can transmit data including a second ID of the smart watch 200 to the external device 300. In this case, the second ID of the smart watch 200 may be different from a first ID of the portable device 100. Having received the data including the second ID, the external device 300 can transmit a reply data to the portable device 100. In this case, as an example, the portable device 100 can transmit a call initiation signal including the second ID to the external device 300. Having received the call initiation signal including the second ID, the external device 300 can connect a channel to initiate a call with the portable device 100. By doing so, a user of the smart watch 200 can make a call with the external device 300 via the portable device 100 of a different user. In this case, the portable device 100 can generate a memo 920 in the portable device 100 by a control input 910 for a user to input the memo 920. By doing so, in case that the user of the smart watch 200 makes a call with the external device 300 using the portable device 100 of the different user, the user of the smart watch 200 can input the memo 920 to the portable device of the different user while making a call. In this case, according to one embodiment, the portable device 100 may be in a state of being synchronized or paired with the smart watch 200.

And, the portable device 100 can transmit the generated memo 920 to the smart watch 200. In this case, as an example, having terminated the call with the external device 300, the portable device 100 can transmit the memo 920 to the smart watch 200. And, as an example, if the call with the external device 300 is continued, the portable device 100 can transmit the memo 920 to the smart watch 200. In this case, the portable device 100 detects a control input 910 to transmit the memo to the smart watch 200 and can transmit the memo 920 to the smart watch 200. In this case, the portable device may be in a state of being synchronized or paired with the smart watch 200.

Figure 10:
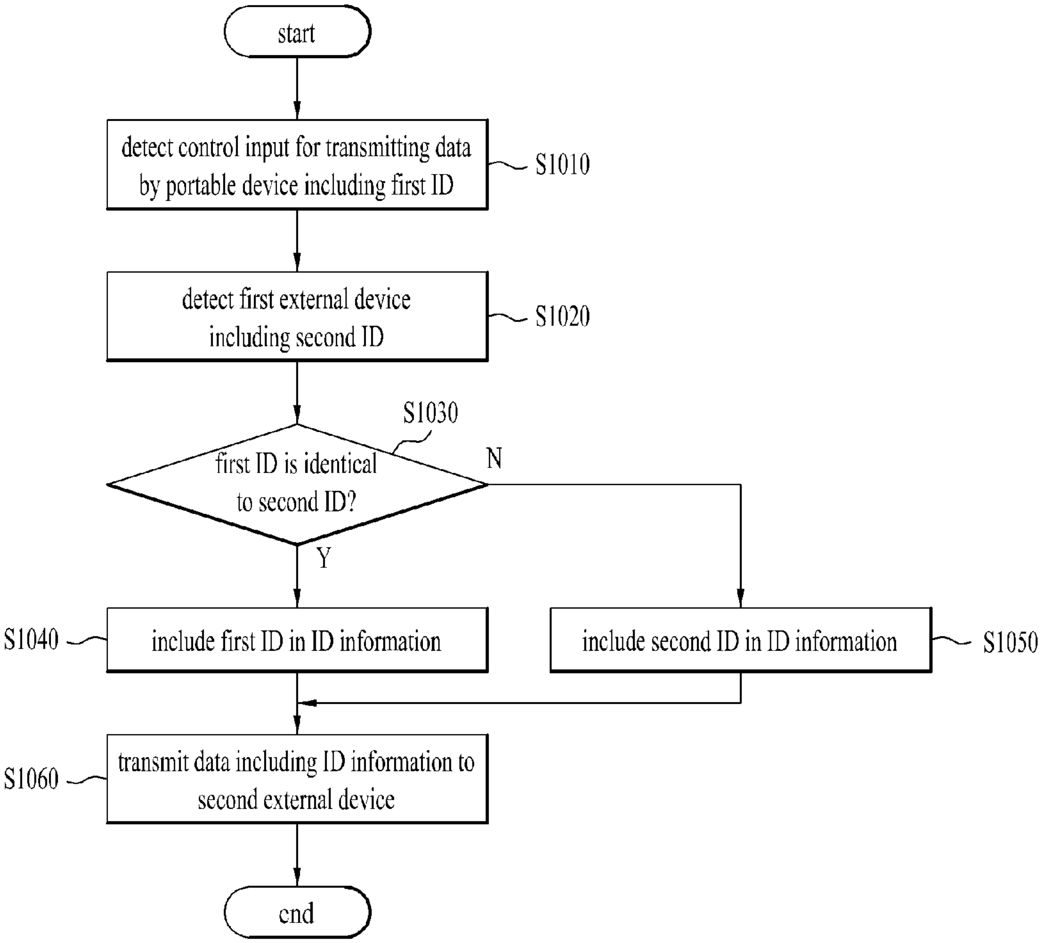
FIG. 10 is a flowchart of a method for a portable device to transmit data including a second ID to an external device according to one embodiment of the present specification.

FIG. 10 is a flowchart of a method for a portable device 100 to transmit data including a second ID to an external device 300 according to one embodiment of the present specification. The portable device 100 may have a first ID. In this case, the portable device can detect a control input to transmit data [S1010]. In this case, as mentioned earlier in FIG. 3, the ID may include user information of each of the aforementioned devices. And, as an example, the ID may include unique identification information of each of the aforementioned devices. More specifically, the ID corresponds to information used for identifying each device and the each device may have a unique ID of its own. As an example, the ID may correspond to user information on each of the portable device 100 and the smart watch 200. In this case, the user information is a value predetermined to a device and can be modified by a user. And, as an example, the ID may correspond to a telephone number included in the portable device 100 and the smart watch 200. In particular, a telephone number set to a smartphone or unique identification information of a smartphone may correspond to the ID, by which the aforementioned embodiment may be non-limited. By doing so, having received the ID, the external device 300 can check a device for transmitting and receiving data.

Having detected a control input to transmit data, the portable device 100 can detect the smart watch 200 including a second ID [S1020]. In this case, as mentioned earlier in FIG. 4*a* to FIG. 4*c*, the first ID of the portable device 100 and the second 1D of the smart watch 200 may be different from each other. In particular, a user of the smart watch 200 can transmit data to the external device 300 using the portable device 100 of a different user. More specifically, having obtained the control input for a user to transmit data to the external device 300, the portable device 100 can detect the smart watch 200. Subsequently, the portable device 100 can obtain the second ID 430 in the detected smart watch 200. In this case, as an example, before detecting the control input for the user to transmit the data, the portable device 100 can perform a pairing with the smart watch. Having performed the pairing with the smart watch, the portable device 100 can immediately obtain the second ID of the smart watch 200 instead of detecting the smart watch 200 according to the control input for the user to transmit the data.

Subsequently, the portable device 100 can compare the first ID of the portable device 100 with the second ID 430 of the smart watch 200 to see whether the first ID and the second ID are identical to each other [S1030]. In this case, as mentioned earlier in FIG. 4*a*, the portable device 100 compares the first ID with the second ID, includes at least one of the first ID and the second ID in ID information, and can transmit data including the ID information to the external device 300. In this case, the ID information can include at least one of the aforementioned first ID 420 of the portable device and the second ID 430 of the smart watch 200. And, the ID information can include detailed information of the aforementioned devices. As an example, the ID information may include information on a device type of the portable device 100. And, as an example, the ID information may include communication protocol information of the portable device 100. By doing so, a communication state can be consistently checked in case that data is exchanged between the portable device 100 and the external device 300.

Subsequently, if the first ID of the portable device 100 is identical to the second ID of the smart watch 200, the portable device 100 can include the first ID of the portable device 100 in the ID information [S1040]. As mentioned earlier in FIG. 4*a*, the portable device 100 includes the ID information including the first ID in data and can transmit the data to the external device 300. In this case, having received the data including the first ID of the portable device 100, the external device 300 can display the first ID of the portable device 100 and information of the portable device 100. And, the external device 300 can transmit a reply data to the portable device 100 according to the data including the first ID 420. And, as an example, having received the data including the first ID 420 of the portable device 100, the external device 300 can connect a channel to consistently exchange the data with the portable device 100. More specifically, the portable device 100 transmits a call initiation signal as the data including the first ID to the external device 300 and the external device 300 can receive the call initiation signal from the portable device. In this case, the portable device 100 initiates a call with the external device 300 and can consistently exchange an audio data or a visual data with the external device.

And, if the first ID of the portable device 100 is different from the second ID of the smart watch 200, the portable device 100 can include the second ID of the smart watch 200 in the ID information [S1050]. As mentioned earlier in FIG. 4*b* and FIG. 4*c*, the portable device 100 can transmit data including the ID information to the external device 300. In particular, the portable device 100 can transmit the second ID of the smart watch 200 only to the external device 300. By doing so, a user of the external device 300 can check that a user of the smart watch 200 transmits data using the portable device 100 of a different user. And, as an example, the portable device 100 can transmit both the second ID of the smart watch 200 and the first ID 420 of the portable device 100 to the external device 300. By doing so, the external device 300 can obtain both information on the user of the smart watch 200 and information on the user of the portable device 100. And, the external device 300 can receive data transmitted by the portable device 100. Having received the data including the second ID of the smart watch 200, the external device 300 can display the second ID of the smart watch 200 and the information of the smart watch 200. By doing so, the user of the smart watch 200 can exchange data with the external device 300 via the portable device 100 of the different user. And, a user of the external device 300 can check that the user of the external device is transceiving data with the user of the smart watch 200 in a manner of receiving the second ID of the smart watch 200. And, as an example, the portable device 100 can transmit a call initiation signal as data including the second ID to the external device 300. In particular, the external device 300 can connect a channel based on the second ID to consistently exchange data with the portable device 100. In this case, the portable device 100 can exchange the data with the external device 300 based on the second ID of the smart watch 200. More specifically, the portable device 100 transmits the call initiation signal as the data including the second ID 430 to the external device 300 and the external device 300 can receive the call initiation signal. By doing so, the user of the smart watch 200 can exchange an audio data or a visual data with the external device in a manner of making a call with the external device 300 via the portable device of the different user. And, as an example, if the user of the smart watch 200 makes a call with the user of the external device 300 based on the second ID, the portable device 100 can move a charge for a data use to the smart watch 200.

In particular, the portable device 100 may have ID information including at least one of the first ID and the second ID. And, the portable device 100 can transmit data including the ID information to the external device 300 [S1060]. As mentioned earlier in FIG. 4*a* to 4*c*, the ID information may include detailed information of the aforementioned devices. As an example, the ID information may include information on a device type of the portable device 100. And, as an example, the ID information may include communication protocol information of the portable device 100. By doing so, a communication state can be consistently checked in case that data is exchanged between the portable device 100 and the external device 300.

Figure 11:
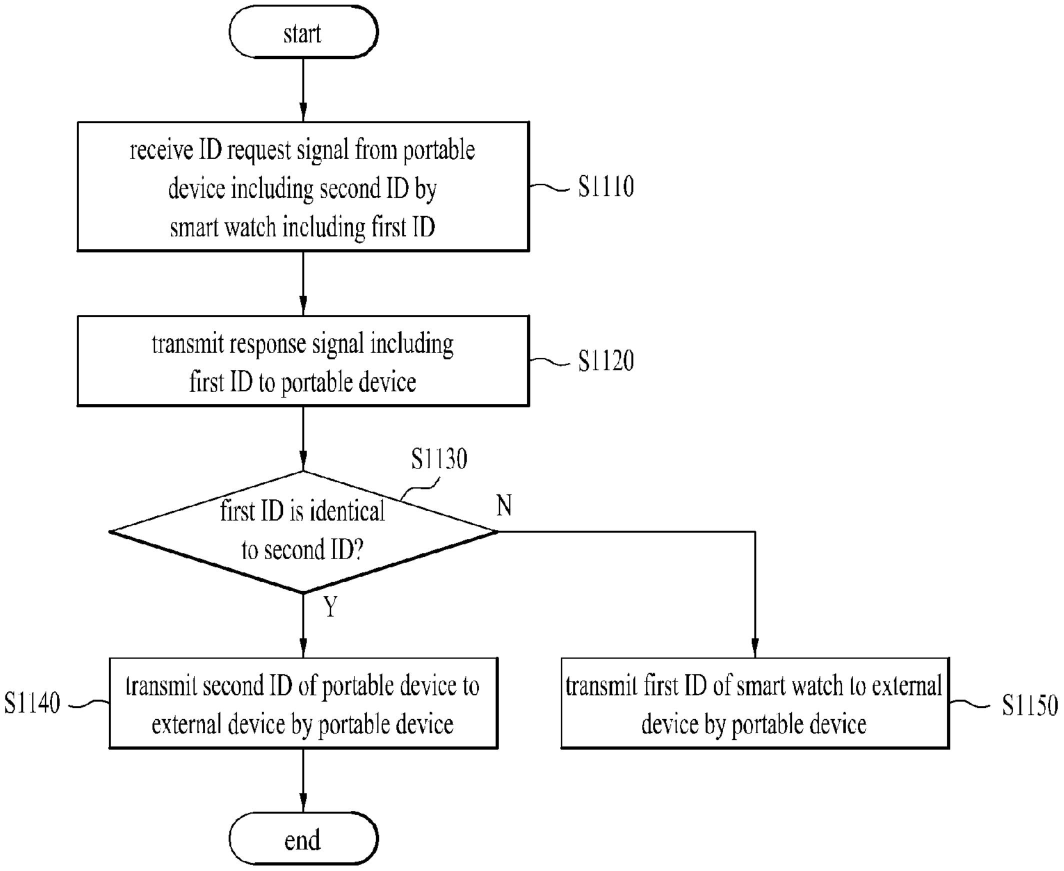
FIG. 11 is a flowchart for a method of transmitting a second ID of a smart watch to an external device via a portable device according to one embodiment of the present specification.

FIG. 11 is a flowchart for a method of transmitting a second ID of a smart watch 200 to an external device via a portable device 100 according to one embodiment of the present specification.

The portable device 100 can transmit an ID request signal to the smart watch 200 to detect the smart watch 200 [S1110]. As mentioned earlier in FIG. 2, the ID request signal is a signal transmitted by the portable device 100. More specifically, having detected a control input to transmit data to the external device, the portable device 100 can transmit the ID request signal to obtain an ID of the smart watch 200. As an example, having performed a pairing with the smart watch 200, the portable device 100 transmits the ID request signal to the smart watch 200 in a state of being paired with the smart watch and can obtain the ID of the smart watch 200. And, the portable device 100 includes identification information of the smart watch 200, transmits the ID request signal to the smart watch 200 based on the identification information, and can obtain the ID of the smart watch 200. As a different example, the portable device 100 selects the smart watch 200 transmitting the ID request signal based on a user input, transmits the ID request signal to the smart watch 200, and can obtain an ID of the smart watch 200.

And, having received the ID request signal, the smart watch 200 can transmit a response signal to the portable device [S1120]. As mentioned earlier in FIG. 2, the response signal may include an ID of the smart watch 200. In this case, the Ill may correspond to unique identification information of the smart watch 200. In this case, the ID of the smart watch 200 may be identical to or different from an ID of the portable device 100.

And, the response signal may include information on the smart watch 200. As an example, the response signal may include information on data use of the smart watch 200, battery information, or information on availability of the smart watch.

Subsequently, the portable device 100 can compare a first ID of the portable device 100 with a second ID 430 of the smart watch 200 to see whether the first ID and the second ID are identical to each other [S1030]. In this case, as mentioned earlier in FIG. 4*a*, the portable device 100 compares the first ID with the second ID, includes at least one of the first ID and the second ID in ID information, and can transmit data including the ID information to the external device 300. In this case, the ID information can include at least one of the aforementioned first ID 420 of the portable device and the second ID 430 of the smart watch 200. And, the ID information can include detailed information of the aforementioned devices. As an example, the ID information may include information on a device type of the portable device 100. And, as an example, the ID information may include communication protocol information of the portable device 100. By doing so, a communication state can be consistently checked in case that data is exchanged between the portable device 100 and the external device 300.

Subsequently, if the first ID of the portable device 100 is identical to the second ID of the smart watch 200, the portable device 100 can include the first ID of the portable device 100 in the ID information [S1040]. As mentioned earlier in FIG. 4*a*, the portable device 100 includes the ID information including the first ID in data and can transmit the data to the external device 300. In this case, having received the data including the first ID of the portable device 100, the external device 300 can display the first ID of the portable device 100 and information of the portable device 100. And, the external device 300 can transmit a reply data to the portable device 100 according to the data including the first ID 420. And, as an example, having received the data including the first ID 420 of the portable device 100, the external device 300 can connect a channel to consistently exchange the data with the portable device 100. More specifically, the portable device 100 transmits a call initiation signal as the data including the first ID to the external device 300 and the external device 300 can receive the call initiation signal from the portable device. In this case, the portable device 100 initiates a call with the external device 300 and can consistently exchange an audio data or a visual data with the external device.

And, if the first ID of the portable device 100 is different from the second ID of the smart watch 200, the portable device 100 can include the second ID of the smart watch 200 in the ID information [S1050]. As mentioned earlier in FIG. 4*b* and FIG. 4*c*, the portable device 100 can transmit data including the ID information to the external device 300. In particular, the portable device 100 can transmit the second ID of the smart watch 200 only to the external device 300. By doing so, a user of the external device 300 can check that a user of the smart watch 200 transmits data using the portable device 100 of a different user. And, as an example, the portable device 100 can transmit both the second ID of the smart watch 200 and the first ID 420 of the portable device 100 to the external device 300. By doing so, the external device 300 can obtain both information on the user of the smart watch 200 and information on the user of the portable device 100. And, the external device 300 can receive data transmitted by the portable device 100. Having received the data including the second ID of the smart watch 200, the external device 300 can display the second ID of the smart watch 200 and the information of the smart watch 200. By doing so, the user of the smart watch 200 can exchange data with the external device 300 via the portable device 100 of the different user. And, a user of the external device 300 can check that the user of the external device is transceiving data with the user of the smart watch 200 in a manner of receiving the second ID of the smart watch 200. And, as an example, the portable device 100 can transmit a call initiation signal as data including the second ID to the external device 300. In particular, the external device 300 can connect a channel based on the second ID to consistently exchange data with the portable device 100. In this case, the portable device 100 can exchange the data with the external device 300 based on the second ID of the smart watch 200. More specifically, the portable device 100 transmits the call initiation signal as the data including the second ID 430 to the external device 300 and the external device 300 can receive the call initiation signal. By doing so, the user of the smart watch 200 can exchange an audio data or a visual data with the external device in a manner of making a call with the external device 300 via the portable device of the different user. And, as an example, if the user of the smart watch 200 makes a call with the user of the external device 300 based on the second ID, the portable device 100 can move a charge for a data use to the smart watch 200.

In particular, the portable device 100 may have ID information including at least one of the first ID and the second ID. And, the portable device 100 can transmit data including the ID information to the external device 300 [S1060]. As mentioned earlier in FIG. 4*a* to 4*c*, the ID information may include detailed information of the aforementioned devices. As an example, the ID information may include information on a device type of the portable device 100. And, as an example, the ID information may include communication protocol information of the portable device 100. By doing so, a communication state can be consistently checked in case that data is exchanged between the portable device 100 and the external device 300.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A portable device 100 and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a portable device 100 and a method of controlling therefor according to the present specification can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions can be complementally applied, if necessary.

What is claimed is:

1. A portable device including a first ID, comprising:

a display unit configured to display visual information;

a sensor unit configure d to sense a control input and deliver the sensed control input to a processor;

a communication unit configured to transceive data with an external device; and the processor configured to control the display unit, the sensor unit, and the communication unit, wherein the processor is further configured to:

if data is transmitted by the control input, detect a first external device including a second ID, when the second ID of the first external device is identical to the first ID of the portable device, include the first ID of the portable device in ID information, when the second ID of the first external device is different from the first ID of the portable device, include the second ID of the first external device in the ID information, and transmit the data including the ID information to a second external device.

2. The portable device of claim 1, wherein the processor is further configured to:

if the second ID of the first external device is different from the first ID of the portable device, additionally include the first ID of the portable device in the ID information.

3. The portable device of claim 1, wherein the processor is further configured to:

if the first external device is detected, transmit an ID request signal to the first external device and receive a response signal transmitted from the first external device based on the ID request signal and wherein the response signal includes the second ID of the first external device.

4. The portable device of claim 3, wherein the processor is further configured to:

if the response signal transmitted from the first external device fails to be received, include the first ID of the portable device in the ID information.

5. The portable device of claim 1, wherein the processor is further configured to:

if the portable device and the first external device are positioned within a threshold distance perform a pairing between the portable device and the first external device using the communication unit.

6. The portable device of claim 1, wherein the processor is further configured to:

if the control input for transmitting the data is detected, transmit a device search signal to neighboring external devices and obtain a list of the neighboring external devices positioned within a threshold distance based on the device search signal and if the control input is detected from a user for selecting the first external device from the list, detect the first external device.

7. The portable device of claim 1, wherein the processor is further configured to:

if the control input is detected from a user for inputting a message, generate the message based on the control input and transmit the data including the ID information and the message to the second external device.

8. The portable device of claim 1, wherein the processor is further configured to:

if the data including the second ID of the first external device is transmitted to the second external device transmit a feedback signal to the first external device using the communication unit.

9. The portable device of claim 8, wherein the feedback signal corresponds to a signal to confirm that the portable device has transmitted the second ID of the first external device to the second external device.

10. The portable device of claim 1, wherein the second external device receives the data including the ID information transmitted by the portable device and if a reply data is transmitted to the portable device based on the received data and the second ID of the first external device is included in the data, the reply data is transmitted to at least one of the portable devices and the first external device.

11. The portable device of claim 10, wherein if the portable device receives the reply data, the reply data includes a third ID of the second device and the second ID of the first external device.

12. The portable device of claim 1, wherein the processor is further configured to:

if the portable device and the second external device are connected by a channel to transceive the data, generate memo information based on a memo input and the memo input is the control input inputted by a user, and if the channel is disconnected, transmit the memo information to the first external device.

13. The portable device of claim 12, wherein the memo infolmation includes at least one of a text data and an audio data.

14. A smart watch including a first ID, comprising:

a communication unit configured to transceive data with an external device; and a processor configured to control the communication unit, wherein the processor is further configured to:

receive an ID request signal transmitted from a first external device including a second ID and transmit a response signal to the first external device based on the ID request signal using the communication unit, wherein the response signal includes the first ID, wherein if the first ID of the smart watch is identical to the second ID of the first external device, the first external device transmits the second ID of the first external device to a second external device, wherein if the first ID of the smart watch is different from the second ID of the first external device, the first external device transmits the first ID of the smart watch to the second external device.

15. The smart watch of claim 14, wherein the processor is further configured to receive a feedback signal from the first external device and provide a feedback to a user based on the feedback signal.

16. The smart watch of claim 15, wherein the feedback signal corresponds to a signal to confirm that the first external device has transmitted the first ID of the smart watch to the second external device.

17. The smart watch of claim 15, wherein the feedback includes at least one of a visual feedback, an audio feedback, and a tactile feedback.

18. The smart watch of claim 14, wherein the processor is further configured to:

if the smart watch and the first external device are positioned within a threshold distance, perform a pairing between the portable device and the first external device using the communication unit.

19. A method of controlling a portable device including a first ID, comprising:

detecting the control input to transmit data;

wherein if the control input for transmitting the data is detected, detect a first external device including a second ID, when the second ID of the first external device is identical to the first ID of the portable device, the first ID of the portable device is included in ID information, when the second ID of the first external device is different from the first ID of the portable device, the second ID of the first external device is included in the ID information; and transmitting the data including the ID information to a second external device.

20. A method of controlling a smart watch including a first ID, comprising receiving an ID request signal from a first external device including a second ID; and transmitting a response signal to the first external device according to the ID request signal, wherein the response signal includes the first ID, wherein if the first ID of the smart watch is identical to the second ID of the first external device, the first external device transmits the second ID of the first external device to a second device, wherein if the first ID of the smart watch is different from the second ID of the first external device, the first external device transmits the first ID of the smart watch to the second external device.

* * * * *